US011743458B2

(12) United States Patent
Chen et al.

(10) Patent No.: US 11,743,458 B2
(45) Date of Patent: Aug. 29, 2023

(54) METHOD AND APPARATUS FOR REDUCTION OF IN-LOOP FILTER BUFFER

(71) Applicant: MEDIATEK INC., Hsinchu (TW)

(72) Inventors: Ching-Yeh Chen, Hsinchu (TW); Tzu-Der Chuang, Hsinchu (TW); Yu-Chi Su, Hsinchu (TW); Chih-Wei Hsu, Hsinchu (TW); Yu-Wen Huang, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 85 days.

(21) Appl. No.: 17/286,713

(22) PCT Filed: Oct. 18, 2019

(86) PCT No.: PCT/CN2019/111895
§ 371 (c)(1),
(2) Date: Apr. 19, 2021

(87) PCT Pub. No.: WO2020/083108
PCT Pub. Date: Apr. 30, 2020

(65) Prior Publication Data
US 2021/0360238 A1 Nov. 18, 2021

Related U.S. Application Data

(60) Provisional application No. 62/768,200, filed on Nov. 16, 2018, provisional application No. 62/750,282, (Continued)

(51) Int. Cl.
*H04N 19/117* (2014.01)
*H04N 19/132* (2014.01)
(Continued)

(52) U.S. Cl.
CPC ......... *H04N 19/117* (2014.11); *H04N 19/132* (2014.11); *H04N 19/176* (2014.11); *H04N 19/186* (2014.11); *H04N 19/80* (2014.11)

(58) Field of Classification Search
CPC .................................................. H04N 19/117
See application file for complete search history.

(56) References Cited

U.S. PATENT DOCUMENTS 9,442,840 B2    9/2016   Ali et al.
10,567,806 B2   2/2020   Tsai et al.
(Continued)

FOREIGN PATENT DOCUMENTS

CN    103503456 A    1/2014
CN    103891292 A    6/2014
(Continued)

OTHER PUBLICATIONS

International Search Report and Written Opinion dated Jan. 8, 2020, issued in application No. PCT/CN2019/111895.
(Continued)

*Primary Examiner* — Chikaodili E Anyikire
*Assistant Examiner* — Shanika M Brumfield
(74) *Attorney, Agent, or Firm* — McClure, Qualey & Rodack, LLP

(57) ABSTRACT

Methods and apparatus for in-loop processing of reconstructed video are disclosed. According to one method, a virtual boundary is determined for to-be-processed pixels in the current picture, where the virtual boundary is aligned with block boundaries and at least one to-be-processed pixel on a first side of the virtual boundary requires one or more second pixels on a second side of the virtual boundary. According to the method, the in-loop processing is modified if a target to-be-processed pixel requires at least one second pixel from the second side of the virtual boundary and the
(Continued)

modified in-loop processing eliminates the need for any second pixel on the second side of the virtual boundary. According to another method, the operations of block classification are changed when part of the required pixels in one 10×10 window used in classification are at the other side of virtual boundaries.

11 Claims, 29 Drawing Sheets

Related U.S. Application Data filed on Oct. 25, 2018, provisional application No. 62/749,145, filed on Oct. 23, 2018.

(51) Int. Cl.
*H04N 19/176* (2014.01)
*H04N 19/186* (2014.01)
*H04N 19/80* (2014.01)

(56) References Cited

U.S. PATENT DOCUMENTS

| | | | |
|---|---|---|---|
| 2012/0082244 A1 | 4/2012 | Chen et al. | |
| 2013/0028531 A1* | 1/2013 | Sato | H04N 19/117 |
| | | | 382/233 |
| 2013/0044809 A1* | 2/2013 | Chong | H04N 19/85 |
| | | | 375/E7.076 |
| 2013/0322523 A1* | 12/2013 | Huang | H04N 19/134 |
| | | | 375/240.02 |
| 2014/0173179 A1 | 6/2014 | Ali et al. | |
| 2014/0198844 A1 | 7/2014 | Hsu et al. | |
| 2022/0132117 A1* | 4/2022 | Zhang | H04N 19/176 |

FOREIGN PATENT DOCUMENTS

| | | |
|---|---|---|
| CN | 104885052 A | 9/2015 |
| CN | 105794206 A | 7/2016 |
| CN | 106028050 A | 10/2016 |
| WO | 2013060250 A1 | 5/2013 |

OTHER PUBLICATIONS

Chinese language office action dated Jan. 29, 2021, issued in application No. TW 108137854.
Chen, C., et al.; "Adaptive Loop Filter with Zero Pixel Line Buffers for LCU-based Decoding" (retrieved on Jul. 15, 2011).
Chinese language office action dated Mar. 8, 2023, issued in application No. CN 201980068336.2.
Extended European Search Report dated Mar. 27, 2023, issued in application No. EP 23153780.4.
Chen, J., et al.; "Algorithm Description of Joint Exploration Test Model 4 (JEM4);" International Organization for Standardization; Nov. 2016; pp. 1-38.

* cited by examiner

METHOD AND APPARATUS FOR REDUCTION OF IN-LOOP FILTER BUFFER

CROSS REFERENCE TO RELATED APPLICATIONS

The present invention claims priority to U.S. Provisional Patent Application, Ser. No. 62/749,145, filed Oct. 23, 2018, 62/750,282, filed Oct. 25, 2018 and 62/768,200, filed Nov. 16, 2018. The U.S. Provisional Patent Applications are hereby incorporated by reference in their entireties.

FIELD OF THE INVENTION

The present invention relates to filter processing in a video coding system. In particular, the present invention relates to method and apparatus related to in-loop filter processing across a tile or slice boundary in a video encoder or decoder.

BACKGROUND

Motion estimation is an effective inter-frame coding technique to exploit temporal redundancy in video sequences. Motion-compensated inter-frame coding has been widely used in various international video coding standards The motion estimation adopted in various coding standards is often a block-based technique, where motion information such as coding mode and motion vector is determined for each macroblock or similar block configuration. In addition, intra-coding is also adaptively applied, where the picture is processed without reference to any other picture. The inter-predicted or intra-predicted residues are usually further processed by transformation, quantization, and entropy coding to generate a compressed video bitstream. During the encoding process, coding artefacts are introduced, particularly in the quantization process. In order to alleviate the coding artefacts, additional processing has been applied to reconstructed video to enhance picture quality in newer coding systems. The additional processing is often configured in an in-loop operation so that the encoder and decoder may derive the same reference pictures to achieve improved system performance.

FIG. 1A illustrates an exemplary adaptive Inter/Intra video coding system incorporating in-loop processing. For inter-prediction, Motion Estimation (ME)/Motion Compensation (MC) 112 is used to provide prediction data based on video data from other picture or pictures. Switch 114 selects Intra Prediction 110 or inter-prediction data and the selected prediction data is supplied to Adder 116 to form prediction errors, also called residues. The prediction error is then processed by Transformation (T) 118 followed by Quantization (Q) 120. The transformed and quantized residues are then coded by Entropy Encoder 122 to form a video bitstream corresponding to the compressed video data. The bitstream associated with the transform coefficients is then packed with side information such as motion, mode, and other information associated with the image area. The side information may also be subject to entropy coding to reduce required bandwidth. Accordingly, the data associated with the side information are provided to Entropy Encoder 122 as shown in FIG. 1A. When an inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1A, incoming video data undergoes a series of processing in the encoding system. The reconstructed video data from REC 128 may be subject to various impairments due to a series of processing. Accordingly, various in-loop processing is applied to the reconstructed video data before the reconstructed video data are stored in the Reference Picture Buffer 134 in order to improve video quality. In the High Efficiency Video Coding (HEVC) standard being developed, Deblocking Filter (DF) 130, Sample Adaptive Offset (SAO) 131 and Adaptive Loop Filter (ALF) 132 have been developed to enhance picture quality. The in-loop filter information may have to be incorporated in the bitstream so that a decoder can properly recover the required information. Therefore, in-loop filter information from SAO and ALF is provided to Entropy Encoder 122 for incorporation into the bitstream. In FIG. 1A, DF 130 is applied to the reconstructed video first; SAO 131 is then applied to DF-processed video; and ALF 132 is applied to SAO-processed video. However, the processing order among DF, SAO and ALF can be re-arranged.

A corresponding decoder for the encoder of FIG. 1A is shown in FIG. 1B. The video bitstream is decoded by Video Decoder 142 to recover the transformed and quantized residues, SAO/ALF information and other system information. At the decoder side, only Motion Compensation (MC) 113 is performed instead of ME/MC. The decoding process is similar to the reconstruction loop at the encoder side. The recovered transformed and quantized residues, SAO/ALF information and other system information are used to reconstruct the video data. The reconstructed video is further processed by DF 130, SAO 131 and ALF 132 to produce the final enhanced decoded video.

The coding process in HEVC is applied according to Largest Coding Unit (LCU). The LCU is adaptively partitioned into coding units using quadtree. In each leaf CU, DF is performed for each 8×8 block and in HEVC Test Model Version 4.0 (HM-4.0), the DF is applies to 8×8 block boundaries. For each 8×8 block, horizontal filtering across vertical block boundaries is first applied, and then vertical filtering across horizontal block boundaries is applied. During processing of a luma block boundary, four pixels of each side are involved in filter parameter derivation, and up to three pixels on each side can be changed after filtering. For horizontal filtering across vertical block boundaries, unfiltered reconstructed pixels (i.e., pre-DF pixels) are used for filter parameter derivation and also used as source pixels for filtering. For vertical filtering across horizontal block boundaries, unfiltered reconstructed pixels (i.e., pre-DF pixels) are used for filter parameter derivation, and DF intermediate pixels (i.e. pixels after horizontal filtering) are used for filtering. For DF processing of a chroma block boundary, two pixels of each side are involved in filter parameter derivation, and at most one pixel on each side is changed after filtering. For horizontal filtering across vertical block boundaries, unfiltered reconstructed pixels are used for filter parameter derivation and are used as source pixels for filtering. For vertical filtering across horizontal block boundaries, DF processed intermediate pixels (i.e. pixels after horizontal filtering) are used for filter parameter derivation and also used as source pixel for filtering.

Sample Adaptive Offset (SAO) 131 is also adopted in HM-4.0, as shown in FIG. 1A. SAO can be regarded as a special case of filtering where the processing only applies to one pixel. In SAO, pixel classification is first done to classify pixels into different groups (also called categories or classes). The pixel classification for each pixel is based on a 3×3 window. Upon the classification of all pixels in a picture or a region, one offset is derived and transmitted for each group of pixels. ALF is not adopted by the HEVC (High Efficiency Video Coding). However, ALF is being considered for the emerging video coding standard, named VVC (Versatile Video Coding). The filter coefficients of ALF are derived by minimizing the sum of the distortion between filtered samples and original samples. Furthermore, the derived filter coefficients are signalled in the bitstream with on/off control flags. Multiple filters can be used in one slice and the filter selection includes implicit selection by block-based classification and explicit selection by signalled syntax.

In HM-4.0, DF is applied on 8×8 block boundaries to reduce the visibility of artefacts at block boundaries. FIG. 2 shows a vertical boundary 212 in block 210 and a horizontal boundary 222 in block 220, where 8×8 blocks are partly shown (4×8 or 8×4). In one picture, all vertical boundaries can be horizontally filtered in parallel, and then all horizontal boundaries can be vertically filtered in parallel. During processing of a luma boundary, four pixels of each side ($p_0$-$p_3$, $q_0$-$q_3$) are involved in filter parameter derivation, and at most three pixels of each side ($p_0$-$p_2$, $q_0$-$q_2$) can be changed after filtering. For luma horizontal DF, pre-DF pixels (i.e. pixels before horizontal DF) are used for deriving filter parameters and filtering. For luma vertical DF, pre-DF pixels are used for deriving filter parameters, and H-DF pixels (i.e. pixels after horizontal DF) are used for filtering. During processing of a chroma boundary, two pixels of each side ($p_0$-$p_1$, $q_0$-$q_1$) are involved in filter parameter derivation, and at most one pixel of each side ($p_0$, $q_0$) is changed after filtering. For chroma horizontal DF, pre-DF pixels are used for deriving filter parameters and filtering. For chroma vertical DF, H-DF pixels are used for deriving filter parameters and filtering.

In HM-4.0, SAO is applied to luma and chroma components, and each of the luma components is independently processed. SAO can divide one picture into multiple LCU-aligned regions, and each region can select one SAO type among two Band Offset (BO) types, four Edge Offset (EO) types, and no processing (OFF). For each to-be-processed (also called to-be-filtered) pixel, BO uses the pixel intensity to classify the pixel into a band. The pixel intensity range is equally divided into 32 bands as shown in FIG. 3. After pixel classification, one offset is derived for all pixels of each band, and the offsets of center 16 bands or outer 16 bands are selected and coded. As for EO, it uses two neighboring pixels of a to-be-processed pixel to classify the pixel into a category. The four EO types correspond to 0°, 90°, 135°, and 45° as shown in FIG. 4. Similar to BO, one offset is derived for all pixels of each category except for category 0, where Category 0 is forced to use zero offset. Table 1 shows the EO pixel classification, where "C" denotes the pixel to be classified.

TABLE 1

| Category | Condition |
| --- | --- |
| 1 | C < two neighbors |
| 2 | C < one neighbor && C == one neighbor |
| 3 | C > one neighbor && C == one neighbor |
| 4 | C > two neighbors |
| 0 | None of the above |

In HM-4.0, ALF has two filter shape options, cross11×5 (510) and snowflake5×5 (520), for luma and chroma, as shown in FIG. 5. In each picture, the luma component can choose one shape, and the chroma components can choose one shape. Up to 16 luma filters and at most one chroma filter can be applied for each picture. In order to allow localization of ALF, there are two modes for luma pixels to select filters. One is a region-based adaptation (RA) mode, and the other is a block-based adaptation (BA) mode. The RA mode divides one luma picture into 16 regions. Once the picture size is known, the 16 regions are determined and fixed. The regions can be merged, and one filter is used for each region after merging. The BA mode uses edge activity and direction as a property for each 4×4 block. Calculating the property of a 4×4 block (610) requires 5×5 pixels (612), as shown in FIG. 6A. After the properties of 4×4 blocks are calculated, they are classified into 15 categories. The categories can be merged, and one filter is used for each category after merging. As for the chroma components, since they are relatively flat, no local adaptation is used, and the two components of a picture share one filter.

In the emerging VVC (Versatile Video Coding) standard being developed, more flexible ALF has been disclosed to improve the performance. For block-based classification, one picture is partitioned into several 4×4 luma blocks and one group index is derived for each 4×4 luma block. The group index is used to select luma filter from a filter set. In order to reduced required data for the filter coefficients, the filter coefficients may be rotated based on characteristics of one 4×4 block so that some coefficients don't need to be transmitted. In VVC, up to 25 groups can be used for ALF of one luma filter set, which is associated with 5 activity levels based on the gradients magnitude and 5 directions based on the gradients direction. Different groups can share one filter, where multiple groups can be merged into one merged group and one merged group has one filter.

In order to determine the Group index, the gradients for each 4×4 block are calculated. The gradients include four types corresponding to $Grad_H$:Horizontal gradient, $Grad_V$: Vertical gradient, $Grad_{45}$:Diagonal45 gradient, and $Grad_{135}$: Diagonal135 gradient. The gradient for horizontal, vertical, diagonal 45° and diagonal 135° use three consecutive pixels in respective directions with the center weight equal to −2 and two side weights equal to 1. Block classification is evaluated at selected locations of an evaluation block 620 as shown in FIG. 6B, where the target 4×4 block 622 shown in gray colour is located in the center of the evaluation block. The 8×8 evaluation block is formed by extended 2 pixels on each direction of the 4×4 block. Gradients at 32 positions (i.e., selected locations) are used to calculate the summation of gradients for one 4×4 block, where the selected locations are indicated by small boxes with gradient locations (e.g. $D_{i,j}$). A total of 32 gradients are accumulated for each type and accessing 10×10 samples is required to derive gradients since one additional pixel in each direction is needed for calculating the gradients. As shown in FIG. 6B, the selected locations correspond to 2:1 horizontal sub-sampled locations with one-pixel offset between even lines and odd lines In order to determine the Group index, the following two ratios are further calculated:

$$Ratio_{HV} = max(Grad_H, Grad_V)/min(Grad_H, Grad_V),$$

$$Ratio_{Dia} = max(Grad_{135}, Grad_{45})/min(Grad_{135}, Grad_{45})$$

The direction index (Direction) is determined according to:

| | |
|---|---|
| if (Ratio$_{HV}$ < 2 && Ratio$_{Dia}$ < 2) | Direction = 0 |
| else if (Ratio$_{HV}$ > Ratio$_{Dia}$) | Direction = (Ratio$_{HV}$ > 4.5) ? 2:1 |
| else | Direction = (Ratio$_{Dia}$ > 4.5) ? 4:3 |

The 5 activity levels is determined by quantizing the sum of (GradH+GradV) into 5 levels (Activity). The Group index is calculated from (5×Direction+Activity).

An example of 7×7 diamond filter for luma and 5×5 diamond filter for chroma component are shown in FIG. 6C, where the coefficients are half symmetry across diagonal line 630. In FIG. 6B, coefficients 0-6 are for the 5×5 diamond filter and coefficients 0-12 are for the 7×7 diamond filter. The coefficients are represented in 8 bits with 1 bit for sign and 7 bits for the fractional part. Non-center coefficients are signalled and in the range of [−128, 127] with one clipping threshold, if needed. Center coefficient is set equal to 1.

The line buffer requirement for ALF in VTM 4.0 is shown in FIG. 6D. Filter footprint is 7×7 diamond filter for luma and 5×5 diamond filter for chroma. A total of 6 lines are required for luma filtering process. A total of 4 lines are required for chroma filter process.

The line buffer requirement 4×4 block-based classification for ALF in VTM 4.0 is shown in FIG. 6E. Classification is performed for 4×4 block. One 4×4 block needs a 10×10 window, which is included in 7×7 diamond filter. If unavailable regions for ALF is aligned with 4×4 grid, then only 7 lines are required.

In order to reduce the line buffer usage, virtual boundary is proposed during HEVC standard development. The concept is when ALF is applied to the pixels at one side of virtual boundary, then the pixels at the other side cannot be used as shown in FIG. 6F.

When LCU-based processing is used for DF, SAO, and ALF, the entire decoding process can be done LCU by LCU in a raster scan with an LCU-pipelining fashion for parallel processing of multiple LCUs. In this case, line buffers are required for DF, SAO, and ALF because processing one LCU row requires pixels from the above LCU row. If off-chip line buffers (e.g. DRAM) are used, the external memory bandwidth and power consumption will be increased; if on-chip line buffers (e.g. SRAM) are used, the chip area will be increased. Therefore, although line buffers are already much smaller than picture buffers, it is still desirable to reduce line buffers.

FIG. 7 explains the number of luma line buffers required for DF, SAO, and ALF with LCU-based decoding. Given a current LCU (lower H. LCU boundary 710 and left V. LCU boundary 712), lines A-J are first processed by horizontal DF and then by vertical DF. Next, it is suggested to delay the horizontal DF for lines K-N until the lower LCU is available in order to avoid line buffers of H-DF pixels for the vertical DF for lines K-N, which cannot be processed at this moment because the lower LCU is not yet available and DF needs four pre-DF pixels and four H-DF pixels on each side of the horizontal boundary for deriving filter parameters and filtering, respectively, as illustrated by the 4-pixel stripe (720). Therefore, four lines (K-N) of pre-DF pixels have to be stored for DF. Next, SAO is going to be applied on DF output pixels. Since the vertical DF for lines K-N will not change line K, horizontal DF can be additionally applied on line K for SAO to process line J, as illustrated by the 3×3 square (730). Please note that the H-DF pixels of line K will not be stored in the line buffer and have to be generated again when the lower LCU comes, which is not a problem in hardware. After SAO processes lines A-J, the 4×4 block property, as illustrated by the 4×4 square (740), can be calculated. The 5×5 supporting area (742) is indicated. At this moment ALF can process lines A-H. After this, no further process can be done for the current LCU until the lower LCU comes. When the lower LCU comes, lines K-P are first processed by DF, and then lines K-P are processed by SAO. When SAO is applied to line K, line J is required. Therefore, one line (J) of DF output pixels has to be stored for SAO. Next, the 4×4 block properties for lines I-P are calculated. Finally, lines I-P can be filtered by ALF. When line I is filtered, it requires lines G-K, as illustrated by the filter shape (750) and the center of the filter (752) is indicated. However, calculating block properties of lines I-J still needs lines F-J. Therefore, five lines (F-J) of SAO output pixels have to be stored for ALF. In total, the entire in-loop filtering requires 10 luma line buffers. When the entire decoding system is considered, since the Intra luma prediction already stores one line (N) of pre-DF pixels, this luma line buffer can be shared. Moreover, if a filter index line buffer can be used to store BA mode filter selections for lines G-J, it is not necessary to compute the block properties again during filtering of lines I-J. In this way, one line (F) of SAO output pixels can be saved for ALF. The filter index line buffer requires only 4 bits per 4×4 block, which is only about 10% in comparison with the pixel line buffer.

FIG. 8 explains the number of chroma line buffers required for DF, SAO, and ALF with LCU-based decoding. Given a current LCU (H. LCU boundary 810 and V. LCU boundary 812), lines A-M are first processed by horizontal DF, and then lines A-L are processed by vertical DF. Next, it is suggested to delay the horizontal DF for lines N until the lower LCU comes in order to share the line buffer of pre-DF pixels of line N with intra chroma prediction. As for the vertical DF for lines M-N, it has to wait for the lower LCU. Please recall that chroma DF reads two H-DF pixels and may write one pixel on each side of the boundary, as illustrated by the 2-pixel stripe. Therefore, one line (M) of H-DF pixels and one line (N) of pre-DF pixels have to be stored for DF. Next, SAO is going to be applied on DF output pixels. Since the vertical DF for lines M-N will not change line M, H-DF pixels of line M are also DF output pixels of line M, and SAO can process line L, as illustrated by the 3×3 square (820). After SAO processes lines A-L, ALF can process lines A-J. After this, no further process can be done for the current LCU until the lower LCU comes. When the lower LCU comes, lines N-P are first processed by horizontal DF, and then lines M-P are processed by vertical DF and by SAO. When SAO processes line M, line L is required. Therefore, one line (L) of DF output pixels has to be stored for SAO. Finally, lines K-P can be filtered by ALF. When line K is filtered, it requires lines I-M, as illustrated by the filter shape (820) with the center of the filter (822) is indicated. Therefore, four lines (I-L) of SAO output pixels have to be stored for ALF. In total, the entire in-loop filtering requires seven chroma line buffers.

Virtual Boundaries to Reduce Line Buffer Usage

In order to eliminate the line buffer requirements of SAO and ALF, we introduce the concept of virtual boundary (VB). As shown in FIG. 9A, VBs are upward shifted horizontal LCU boundaries by N pixels. In FIG. 9B, VBs are left shifted vertical LCU boundaries by N pixels. For each LCU, SAO and ALF can process pixels above the VB before the lower LCU comes but cannot process pixels below the VB until the lower LCU comes, which is caused by DF. With consideration of the DF in HM-4.0, the space between the proposed VB and the horizontal LCU boundary is set as three pixels for luma (i.e. N=3 in FIG. 9A and FIG. 9B) and one pixel for chroma (i.e. N=1 in FIG. 9A and FIG. 9B). SAO and ALF are modified to ensure that every to-be-processed pixel on one side of a VB does not require any data access from the other side of the VB unless the data can become available in time without using any additional line buffer.

BRIEF SUMMARY OF THE INVENTION

A method and apparatus for in-loop processing of reconstructed video are disclosed. According to this method, reconstructed pixels associated with a current picture are received, where the current picture is divided into multiple blocks for in-loop processing of the reconstructed pixels. A virtual boundary is determined for to-be-processed pixels in the current picture, where the virtual boundary is aligned with block boundaries and at least one to-be-processed pixel on a first side of the virtual boundary requires one or more second pixels on a second side of the virtual boundary. According to the method, the in-loop processing is modified if a target to-be-processed pixel requires at least one second pixel from the second side of the virtual boundary and the modified in-loop processing eliminates the need for any second pixel on the second side of the virtual boundary.

In one embodiment, the multiple blocks correspond to 4×4 blocks. In one embodiment, the multiple blocks correspond to smallest units in which all samples share the same in-loop processing. In one embodiment, the in-loop processing corresponds to SAO (Sample Adaptive Offset) processing or ALF (Adaptive Loop Filter) processing. In one embodiment, the reconstructed pixels correspond to luma pixels. For chroma reconstructed pixels of the current picture, a chroma virtual boundary is allowed to cross chroma blocks.

In one embodiment, if the target to-be-processed pixel requires any second pixel from the second side of the virtual boundary, such second pixel from the second side of the virtual boundary are padded. In another embodiment, if the target to-be-processed pixel requires any second pixel from the second side of the virtual boundary, such second pixel from the second side of the virtual boundary are padded using symmetric padding.

According to another embodiment, modified in-loop processing uses a modified filter with reduced footprint to eliminate the need for any second pixel on the second side of the virtual boundary.

The modified in-loop processing can be applied to the reconstructed pixels at an encoder side as well as a decoder side.

According to another method, an extended block covering the target block is determined for a target block belonging to the to-be-processed pixels. Block classification is derived for the target block based on the extended block, where if any target pixel of the extended block required for deriving the block classification is on the second side of the virtual boundary, at least one operation associated with the block classification is modified. The adaptive-loop-filter processing is then applied to the target block using the block classification with at least one operation modified if any target pixel of the extended block required for said deriving the block classification is on the second side of the virtual boundary.

In one embodiment, an evaluation block is determined for the target block, wherein the target block is located at a center of the evaluation block and surrounding pixels are added to the evaluation block to form the extended block. For example, the target block corresponds to a 4×4 block, the evaluation block corresponds to an 8×8 block and the extended block corresponds to a 10×10 block. In another embodiment, the target block corresponds to the smallest unit in which all samples share an identical adaptive-loop-filter processing.

In one embodiment, the block classification is derived based on gradients at selected locations of the evaluation block. In one embodiment, if a target gradient for a target selected location of the evaluation block requires any target pixel of the extended block on the second side of the virtual boundary, the target gradient is excluded from a summation of gradients for the block classification or is set to zero. In this case, the summation of gradients are normalized by a total number of available gradients at the selected locations of the evaluation block. Alternatively, the summation of gradients are weighted according to a total number of available gradients at the selected locations of the evaluation block.

In one embodiment, if a target gradient for a target selected location of the evaluation block requires any target pixel of the extended block on the second side of the virtual boundary, the target gradient for the target selected location of the evaluation block is modified to exclude said any target pixel of the extended block on the second side of the virtual boundary.

In one embodiment, the selected locations of the evaluation block correspond to 2:1 horizontal sub-sampled locations with one-pixel offset between even lines and odd lines.

BRIEF DESCRIPTION OF THE DRAWINGS

FIG. 12 illustrates an example VB processing for pixels above the VB, where pixels above the VB are processed by vertical DF.

FIG. 13 illustrates an example VB processing for pixels above the VB, where pixels above the VB are going to be processed by SAO.

FIG. 18 illustrates an example VB processing for pixels above the VB, where cross9×9 is also selected for ALF, SAO output pixels of the last three rows (lines $p_0$-$p_2$) of the cross9×9 for filtering line $p_4$ are not yet available and are replaced by pre-DF pixels.

FIG. 19 illustrates an example VB processing for pixels above the VB, where all pixels above the VB have been processed by ALF. At this moment, pixels above the VB can be written to a decoded picture buffer before the lower LCU comes.

Figures 22, 23:
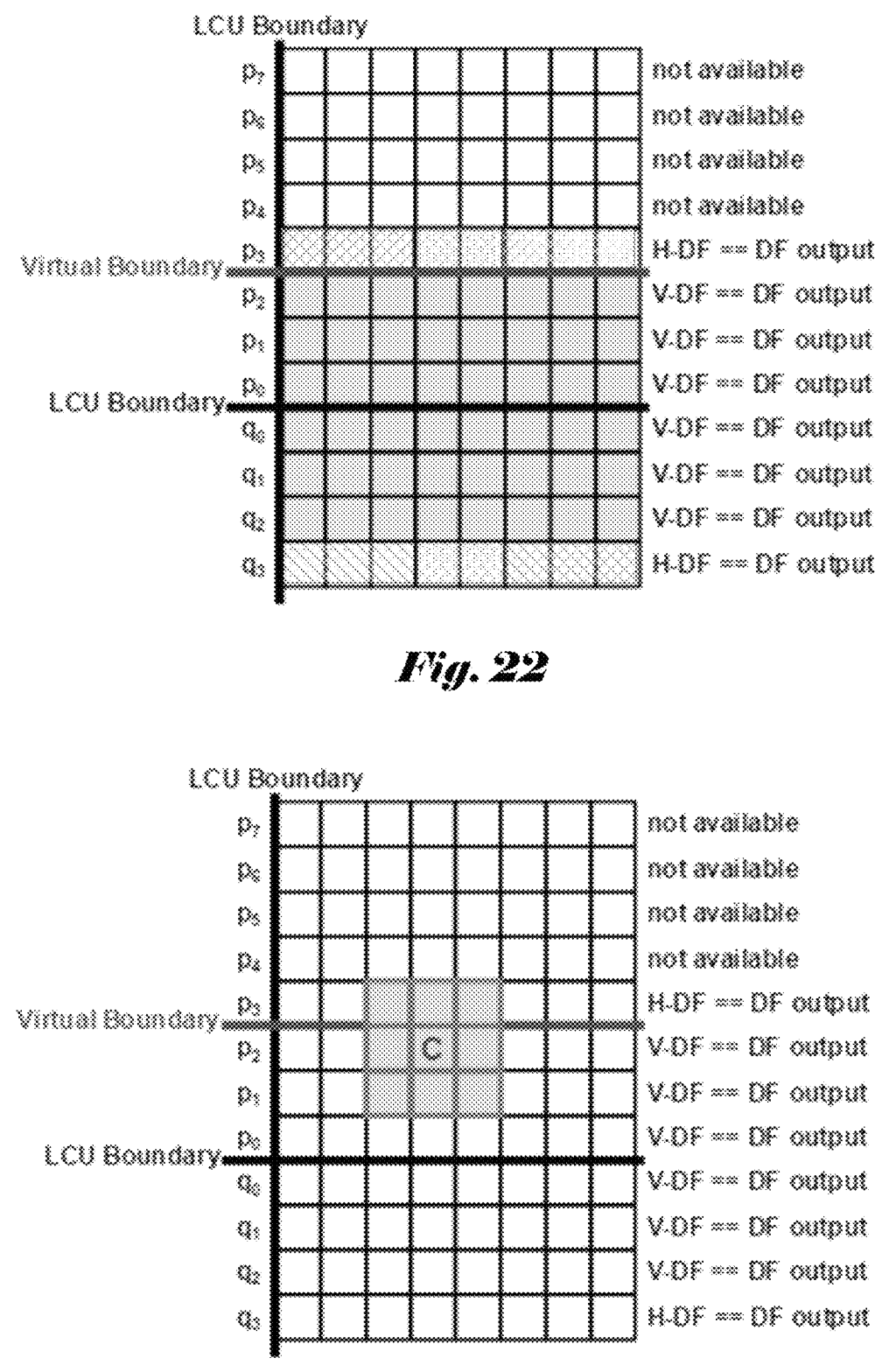
Figures 24, 25:
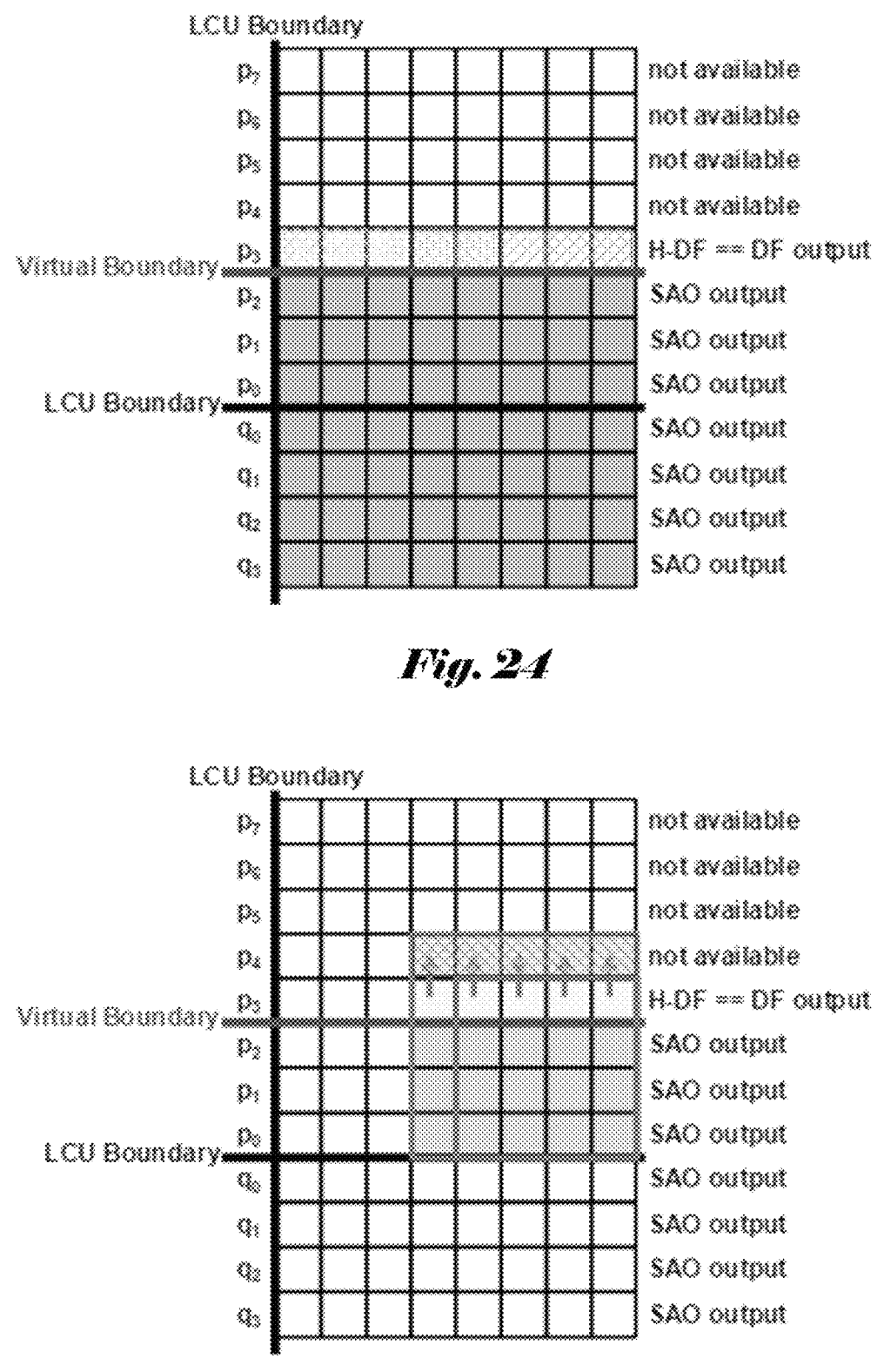
Figures 26, 27:
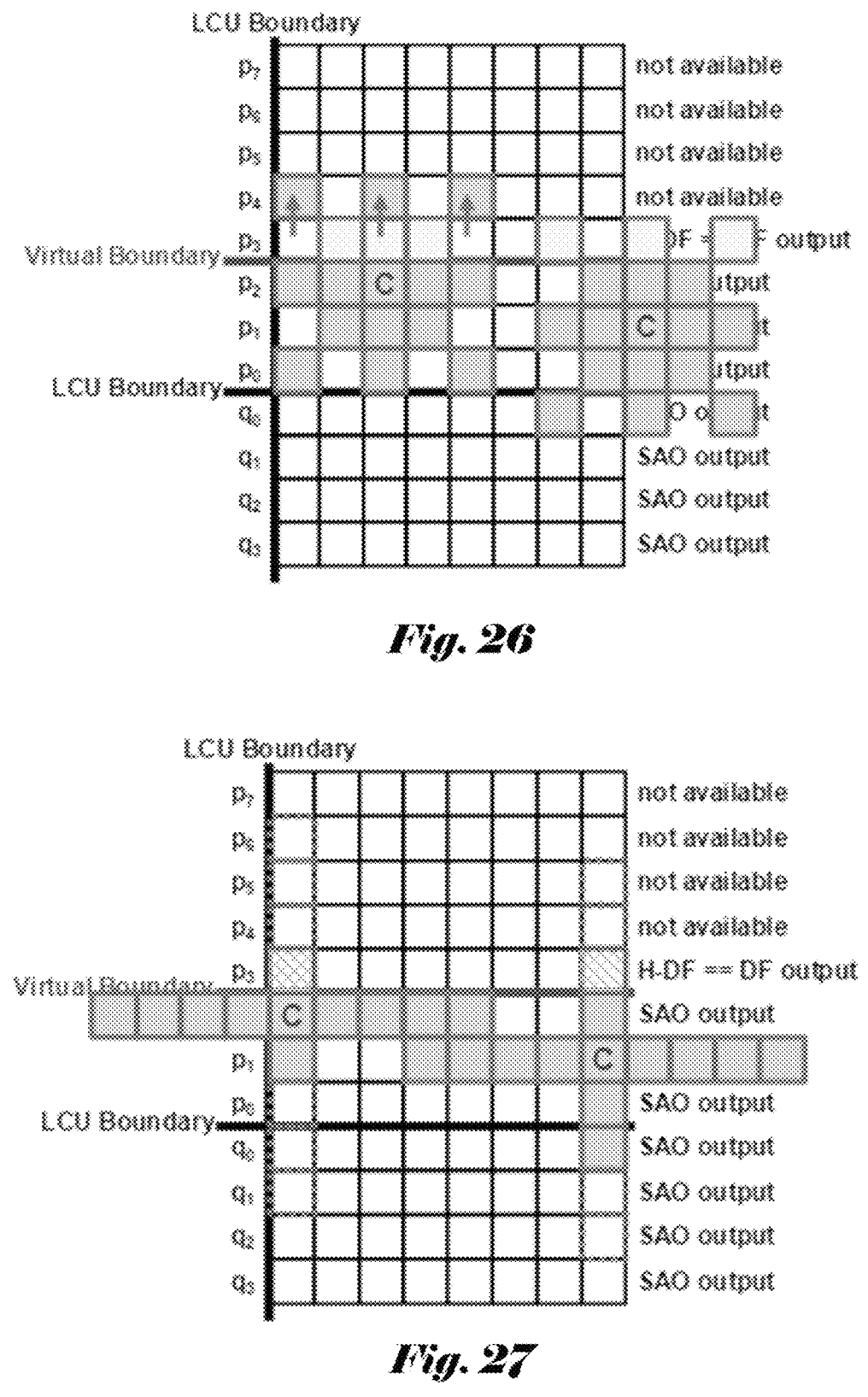
Figures 28, 29:
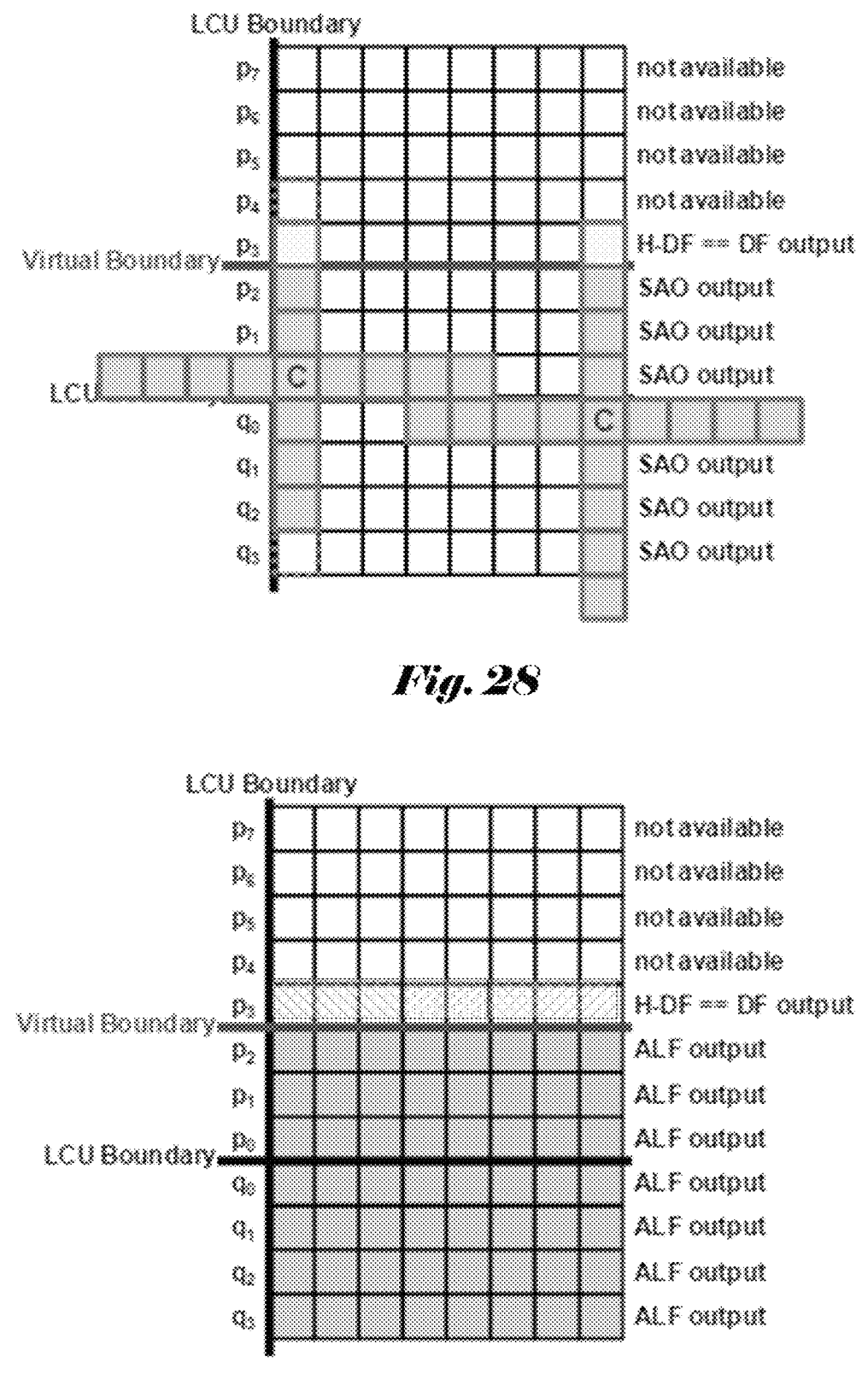

FIGS. 20-29 illustrate the proposed luma VB processing for pixels below the VB.

FIG. 20 illustrates an example VB processing for pixels below the VB, where four lines (i.e., $p_0$-$p_3$) of pre-DF pixels can be read from the DF line buffers.

FIG. 21 illustrates an example VB processing for pixels below the VB, where pixels of line $p_3$ and pixels below the VB are processed by horizontal DF.

FIG. 22 illustrates an example VB processing for pixels below the VB, where the pixels below the VB are processed by vertical DF.

FIG. 23 illustrates an example VB processing for pixels below the VB, where the pixels below the VB are going to be processed by SAO.

FIG. 24 illustrates an example VB processing for pixels below the VB, where all pixels below the VB (and above the next VB) have been processed by SAO.

FIG. 25 illustrates an example VB processing for pixels below the VB, where SAO output pixels of line $p_3$ are replaced by the available DF output pixels.

FIG. 26 illustrates an example VB processing for pixels below the VB, where for filtering line $p_2$, SAO output pixels of the second row (i.e., line $p_3$) of the snowflake5×5 are replaced by DF output pixels; and SAO output pixels of the first row (i.e., line $p_4$) of the snowflake5×5 are replaced by nearest DF output pixels of line $p_3$.

FIG. 27 illustrates an example VB processing for pixels below the VB, where cross9×9 is selected for ALF; for filtering line $p_2$, the filter shape is reduced to cross9×3 with adding the six discarded coefficients to the center pixel; and SAO output pixels of the first row (i.e., line $p_3$) of the cross9×3 are replaced by DF output pixels.

FIG. 28 illustrates an example VB processing for pixels below the VB, where cross9×9 is also selected for ALF; for filtering line $p_0$, the filter shape is reduced to cross9×7 with adding the two discarded coefficients to the centre pixel; and SAO output pixels of the first row (i.e., line $p_3$) of the cross9×7 are replaced by DF output pixels.

FIG. 29 illustrates an example VB processing for pixels below the VB, where all pixels below the VB (and above the next VB) have been processed by ALF.

Figures 30, 31:
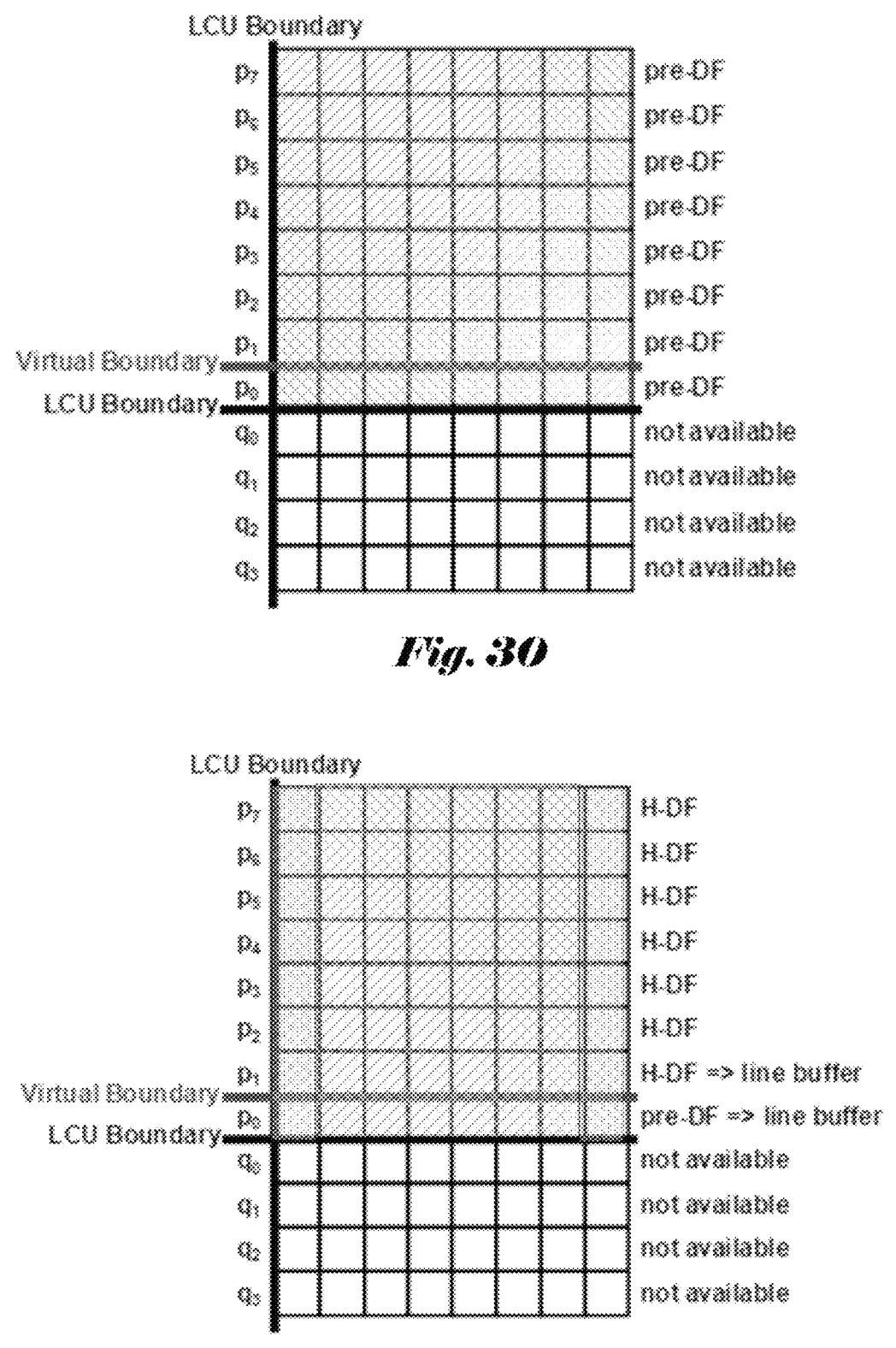
Figures 34, 35:
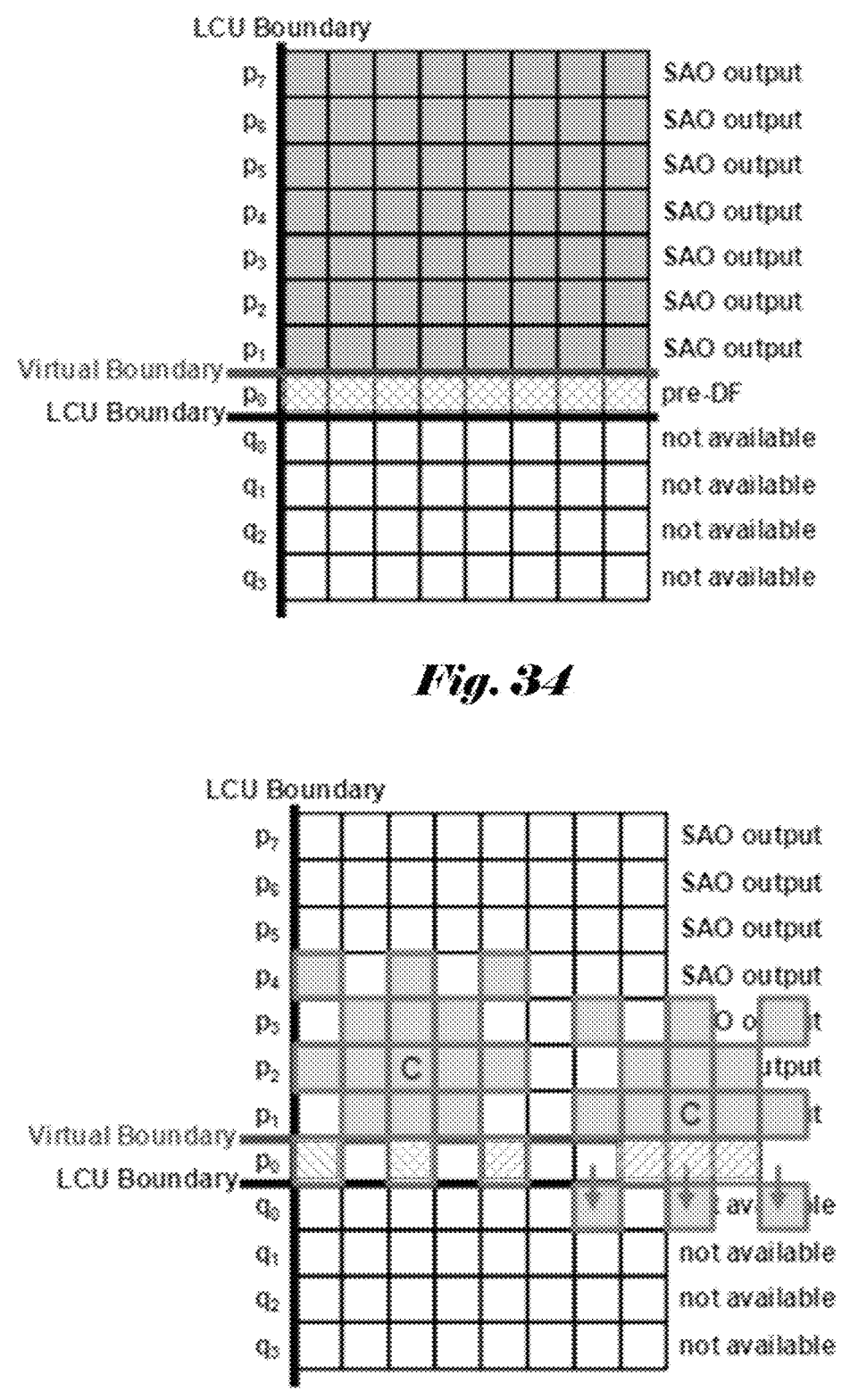

FIGS. 30-38 show the chroma VB processing for pixels above the VB.

Figures 40, 41:
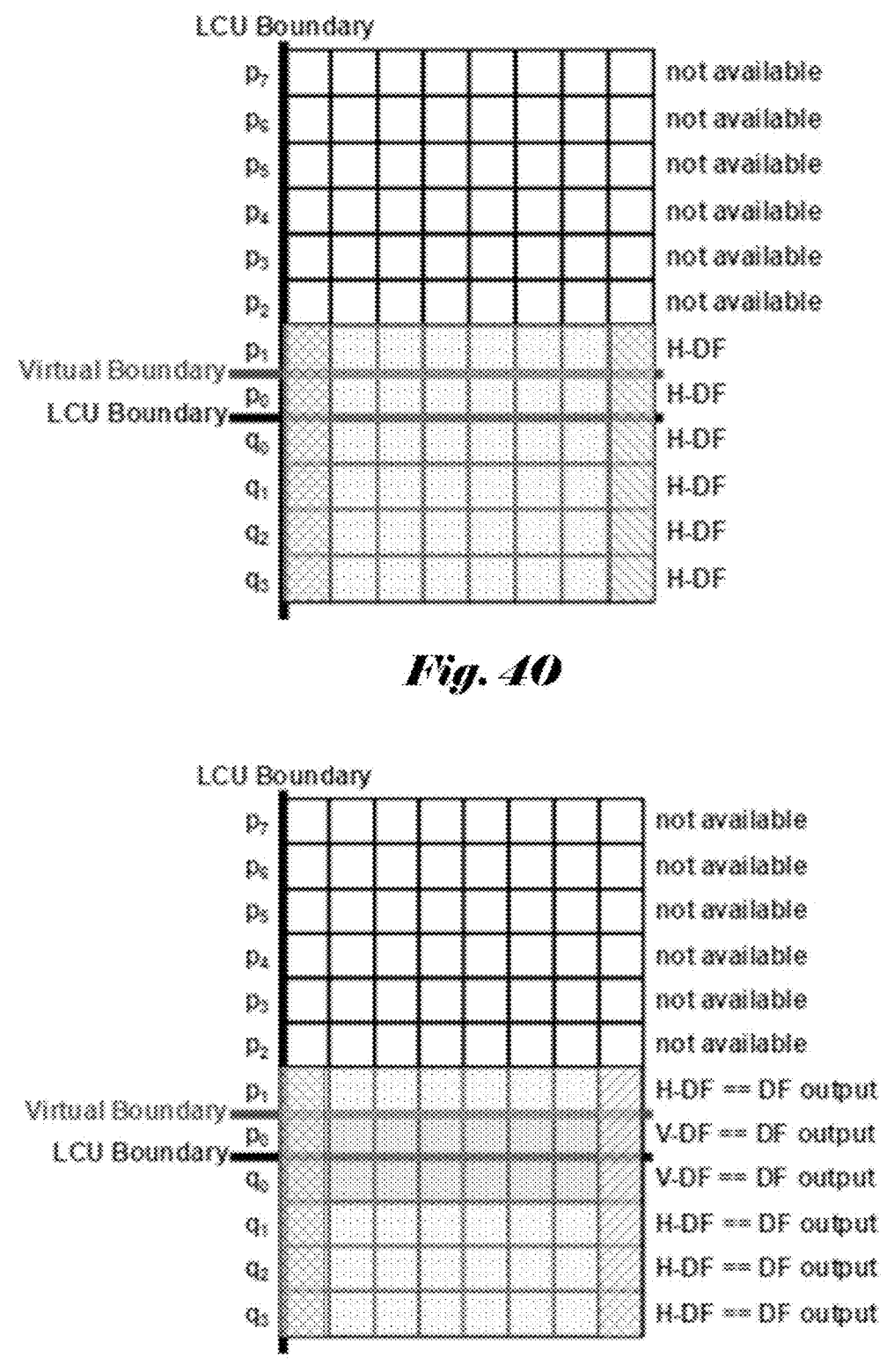
Figures 42, 43:
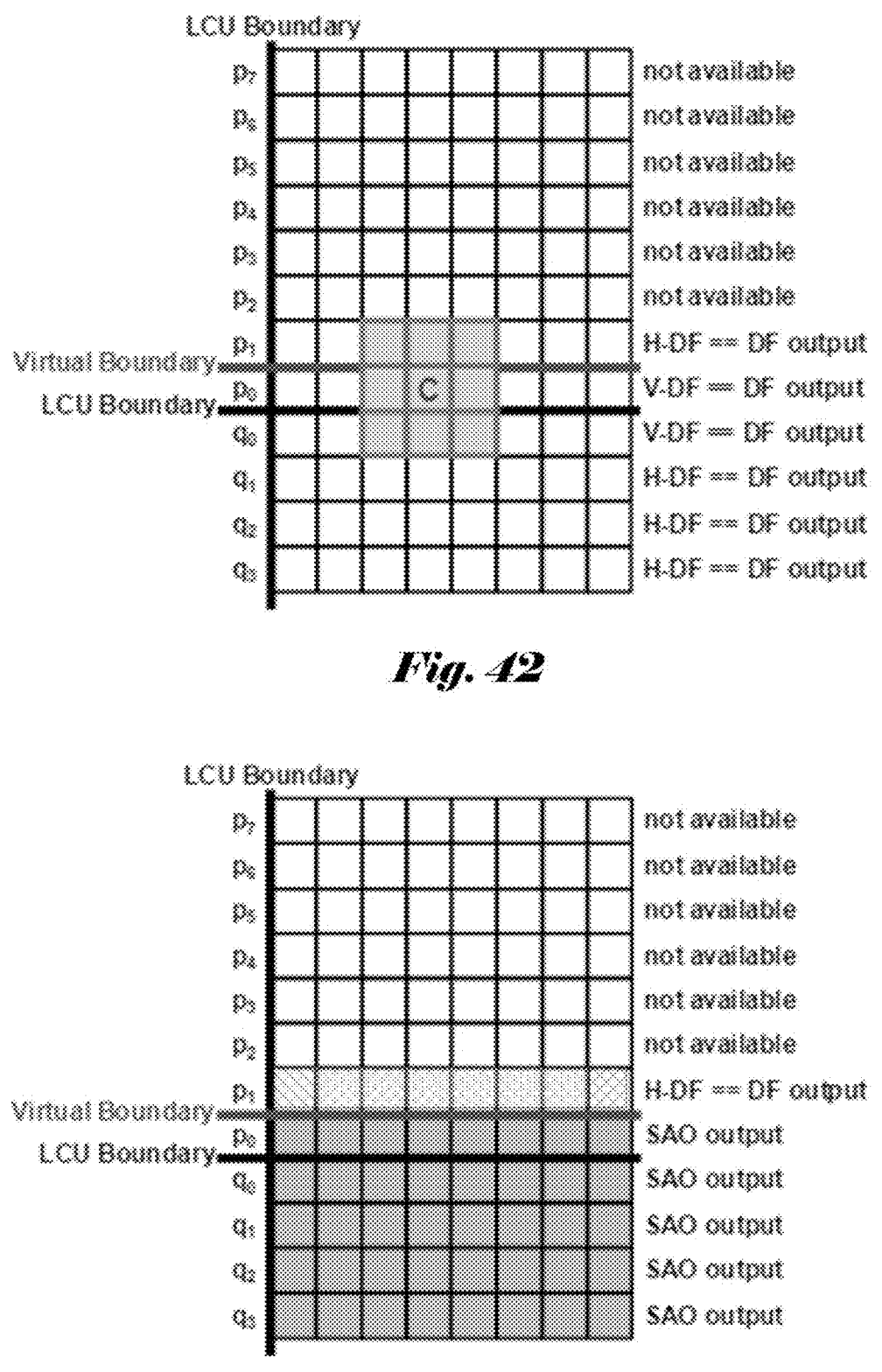

FIGS. 39-47 show the chroma VB processing for pixels below the VB.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 10:
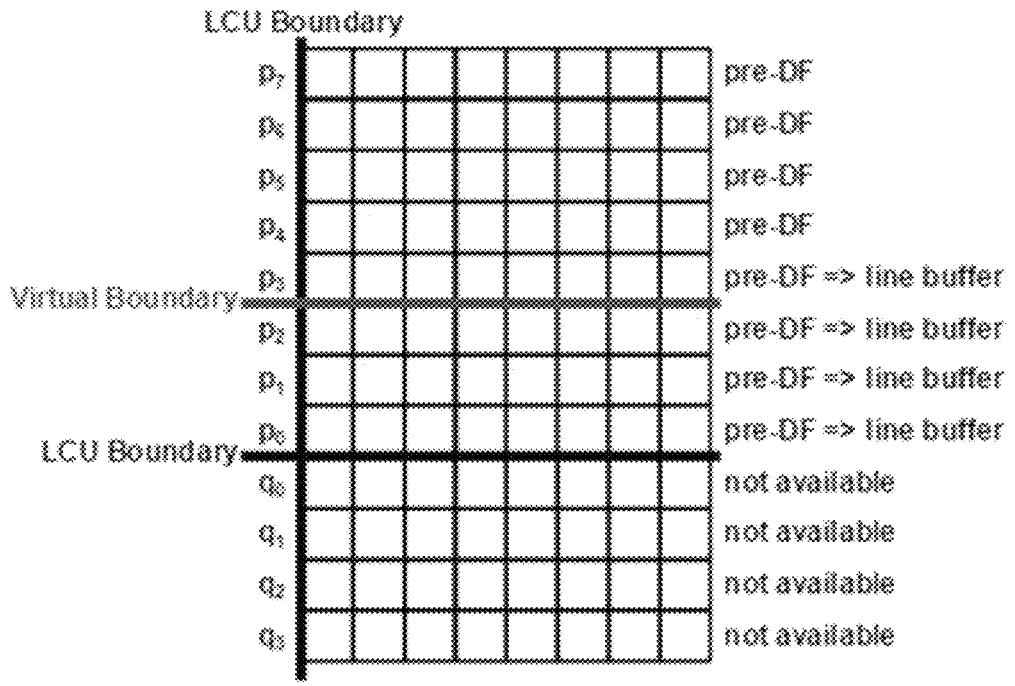
FIG. 10 illustrates an example VB processing for pixels above the VB, where all pixels of the current LCU have been processed by REC, and four lines ($p_0$-$p_3$) of pre-DF pixels are stored in DF line buffers.
Figure 11:
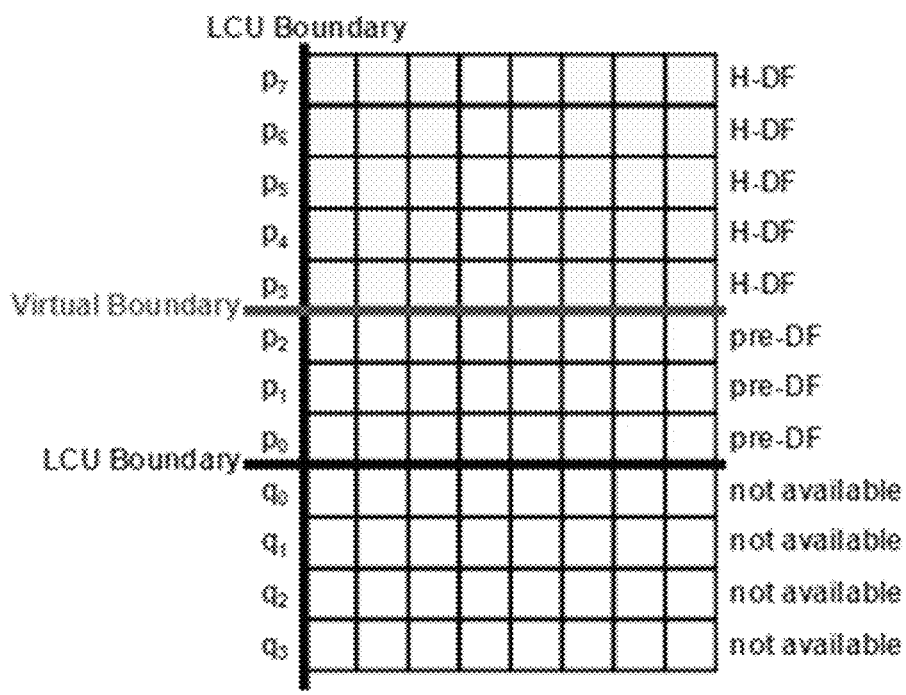
FIG. 11 illustrates an example VB processing for pixels above the VB, where pixels above the VB are processed by horizontal DF.
Figures 12, 13:
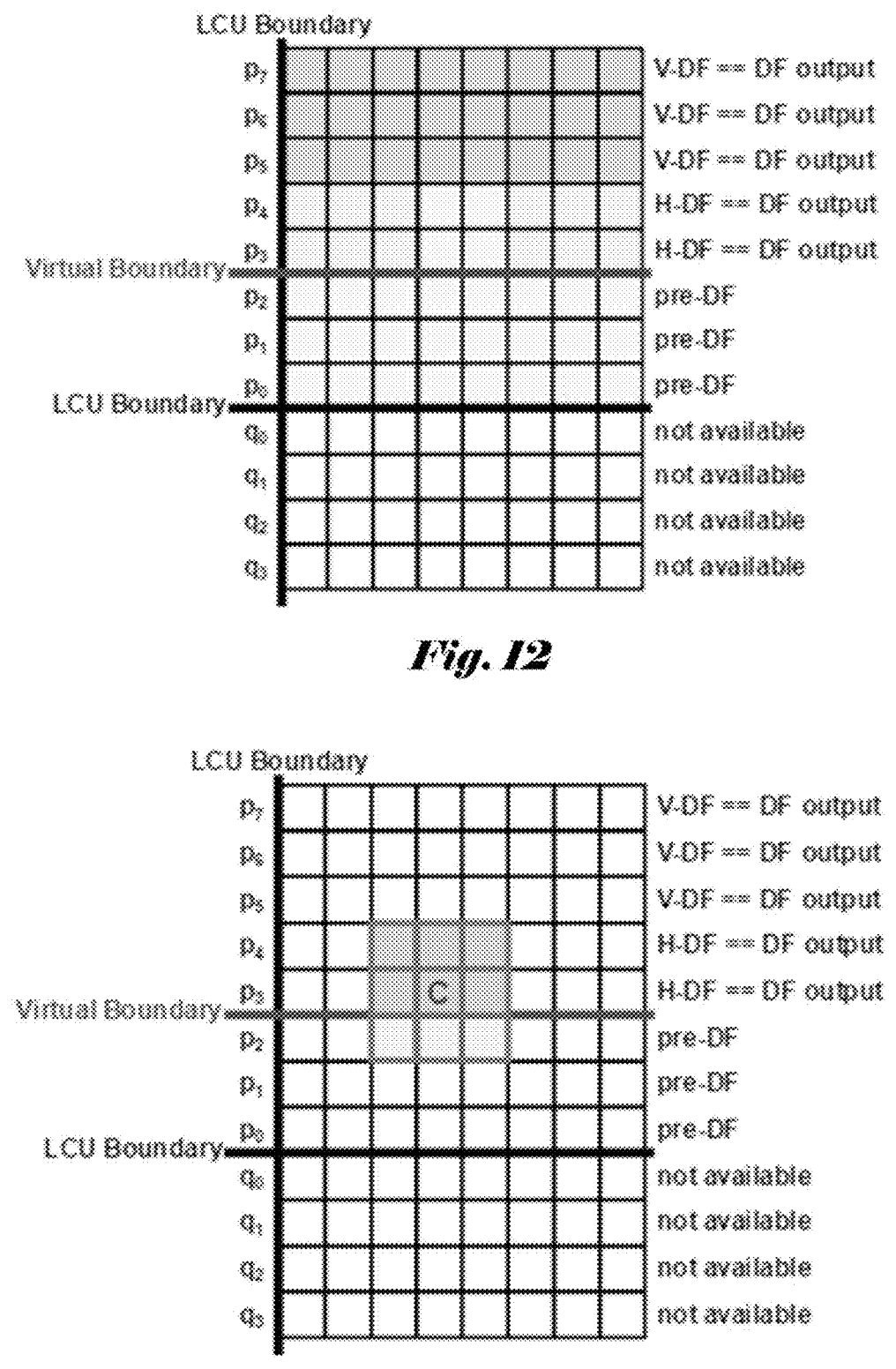
Figure 14:
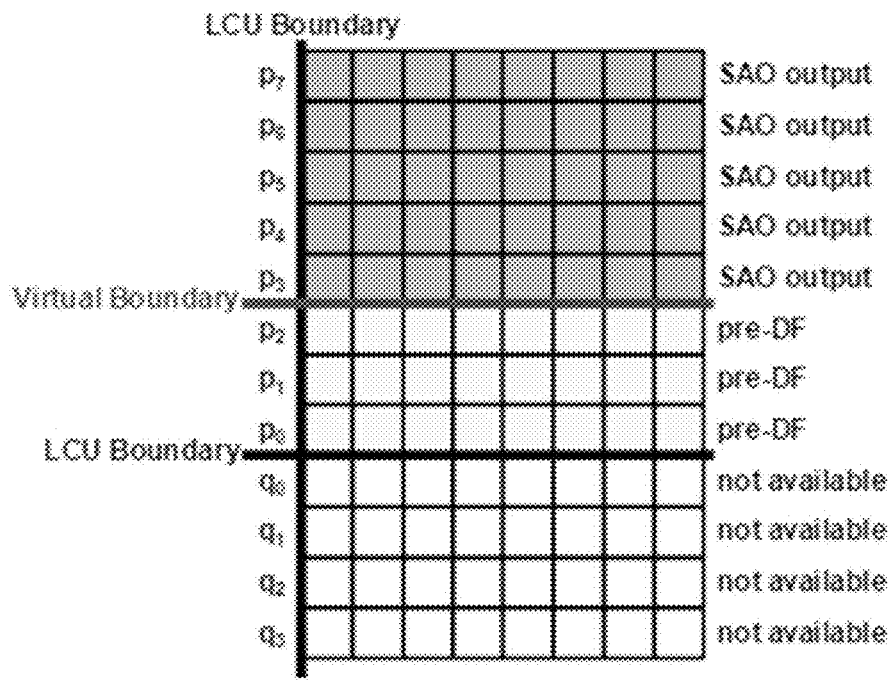
FIG. 14 illustrates an example VB processing for pixels above the VB, where all pixels above the VB have been processed by SAO.
Figure 15:
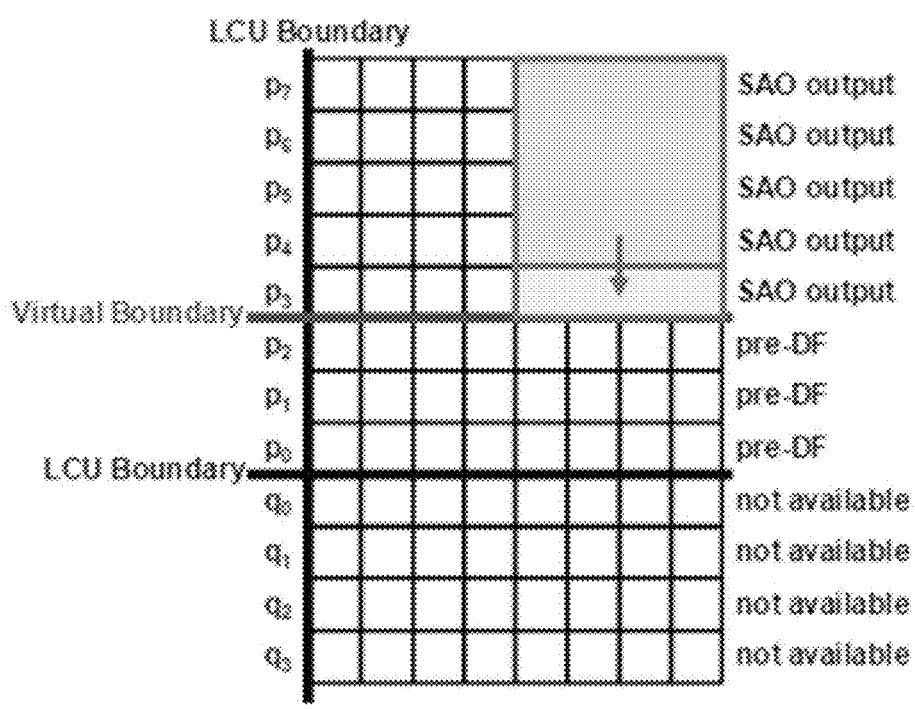
FIG. 15 illustrates an example VB processing for pixels above the VB, where the block properties of lines $p_4$-$p_7$ are directly reused for line $p_3$ since SAO output pixels of lines $p_0$-$p_2$ are not yet available.
Figure 16:
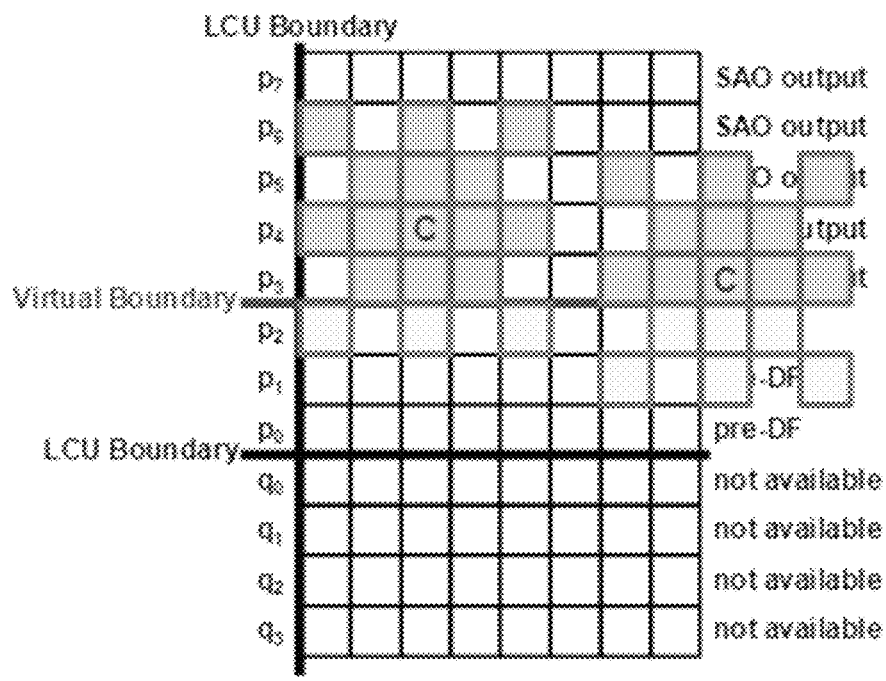
FIG. 16 illustrates an example VB processing for pixels above the VB, where snowflake5×5 is selected for ALF, SAO output pixels of the last row (line $p_2$) of the snowflake5×5 for filtering line $p_4$ and the last two rows (lines $p_1$-$p_2$) of the snowflake5×5 for filtering line $p_3$ are not yet available and are replaced by pre-DF pixels.
Figure 17:
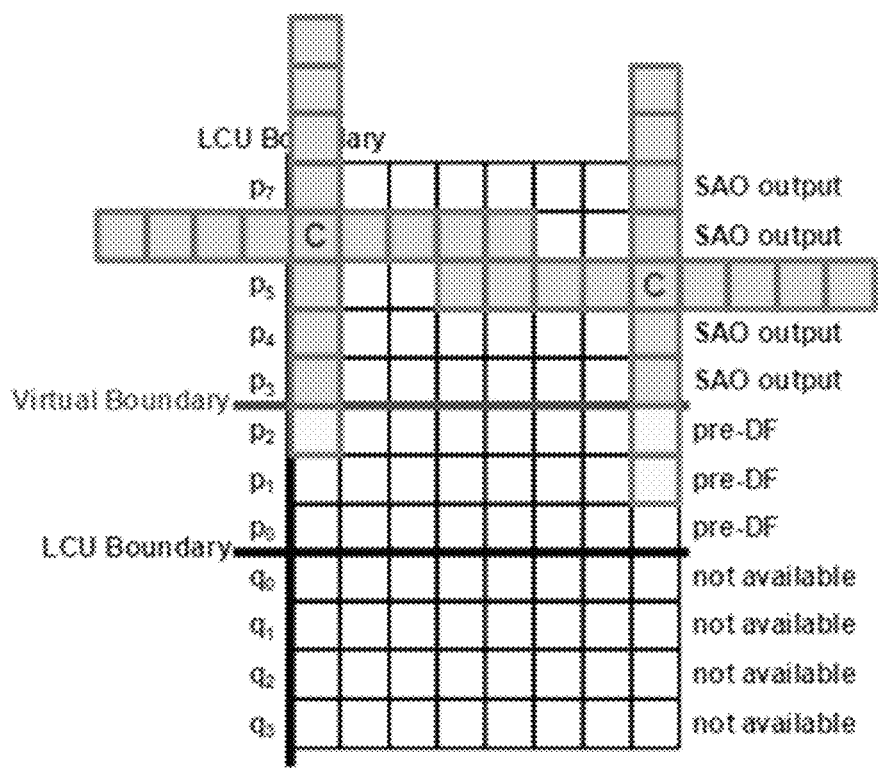
FIG. 17 illustrates an example VB processing for pixels above the VB, where cross9×9 is selected for ALF, SAO output pixels of the last row (line $p_2$) of the cross9×9 for filtering line $p_6$ and the last two rows (lines $p_1$-$p_2$) of the cross9×9 for filtering line $p_5$ are not yet available and are replaced by pre-DF pixels.
Figures 18, 19:
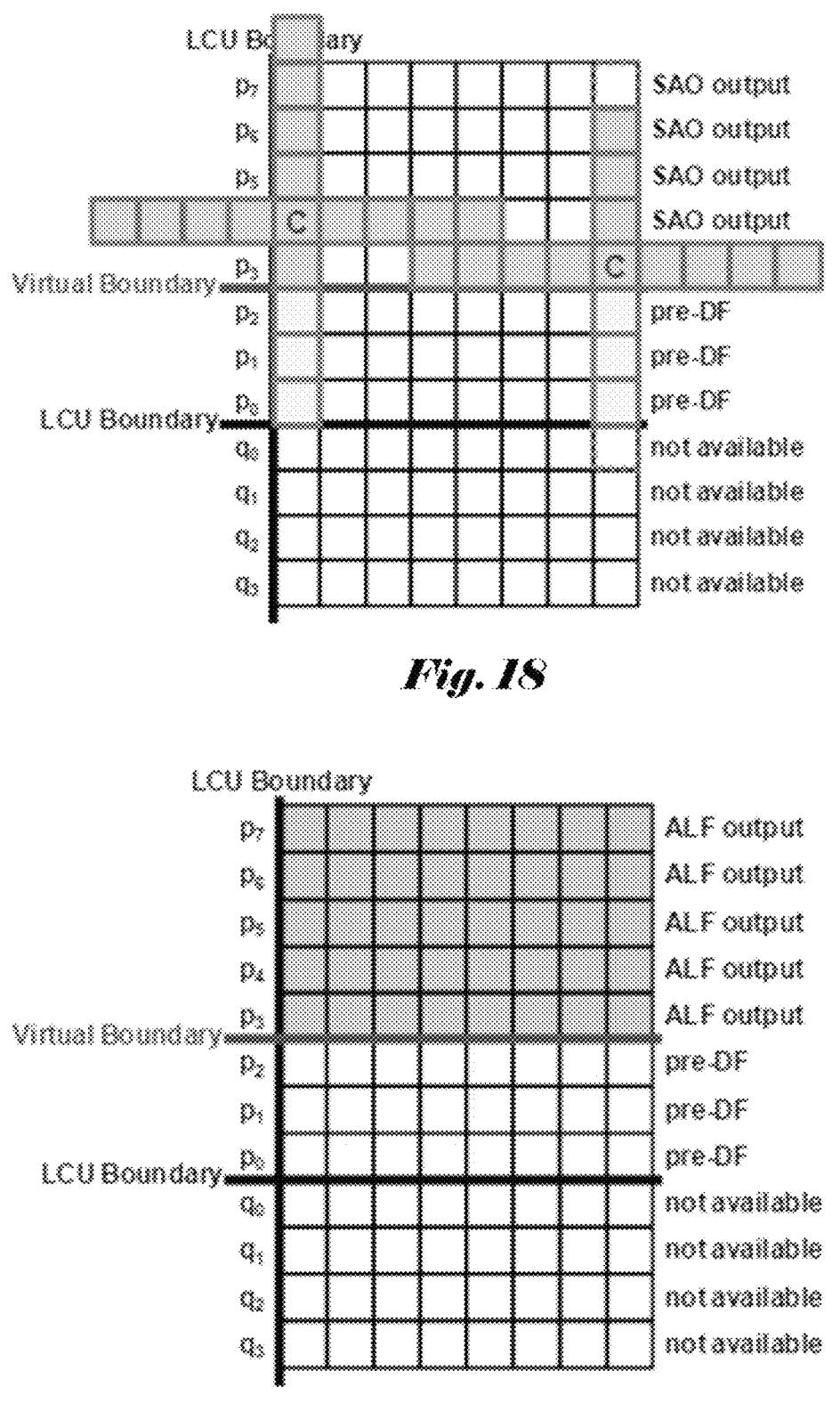

The luma VB processing can be divided into two parts. The first part handles pixels above the VB, while the second part handles pixels below the VB. FIGS. 10-19 illustrate various proposed luma VB processing for pixels above the VB. In FIG. 10, all pixels of the current LCU have been processed by REC, and four lines ($p_0$-$p_3$) of pre-DF pixels are stored in DF line buffers. In FIG. 11, pixels above the VB are processed by horizontal DF. Please recall that luma DF reads four pixels and writes up to three pixels on each side of the 8×8 block boundary. In FIG. 12, pixels above the VB are processed by vertical DF. In FIG. 13, pixels above the VB are going to be processed by SAO. Originally, SAO processing of line $p_3$ may need DF output pixels of line $p_2$. Since DF output pixels of line $p_2$ are not yet available, they are replaced by pre-DF pixels of line $p_2$ for SAO processing of line $p_3$. In FIG. 14, all pixels above the VB have been processed by SAO. In FIGS. 15-18, pixels above the VB are going to be processed by ALF. Originally, calculating ALF block properties of line $p_3$ requires SAO output pixels of lines $p_0$-$p_4$. Since SAO output pixels of lines $p_0$-$p_2$ are not yet available, the block properties of lines $p_4$-$p_7$ are directly reused for line $p_3$, as shown in FIG. 15. During filtering, SAO output pixels below the VB may also be originally needed. In these cases, SAO output pixels are replaced by pre-DF pixels. In FIG. 16, where snowflake5×5 is selected for ALF, SAO output pixels of the last row (i.e., line $p_2$) of the snowflake5×5 for filtering line $p_4$ and the last two rows (i.e., lines $p_1$-$p_2$) of the snowflake5×5 for filtering line $p_3$ are not yet available and are replaced by pre-DF pixels. In FIG. 17, where cross9×9 is selected for ALF, SAO output pixels of the last row (i.e., line $p_2$) of the cross9×9 for filtering line $p_6$ and the last two rows (i.e., lines $p_1$-$p_2$) of the cross9×9 for filtering line $p_5$ are not yet available and are replaced by pre-DF pixels. In FIG. 18, where cross9×9 is also selected for ALF, SAO output pixels of the last three rows (i.e., lines $p_0$-$p_2$) of the cross9×9 for filtering line $p_4$ are not yet available and are replaced by pre-DF pixels. As for filtering line $p_3$, it originally needs line $q_0$, which belongs to the lower LCU. In this case, the filter shape is reduced to cross9×7, and the coefficients at the two vertical ends of the original cross9×9 are added to the center pixel. In this way, it is unnecessary to change ALF syntax, and normalization of coefficients with multiplications and divisions can be avoided. Similarly, SAO output pixels of the last three rows (i.e., lines $p_0$-$p_2$) of the cross9×7 for filtering line $p_3$ are not yet available and are replaced by pre-DF pixels. In FIG. 19, all pixels above the VB have been processed by ALF. At this moment, pixels above the VB can be written to a decoded picture buffer before the lower LCU comes.

Figure 20:
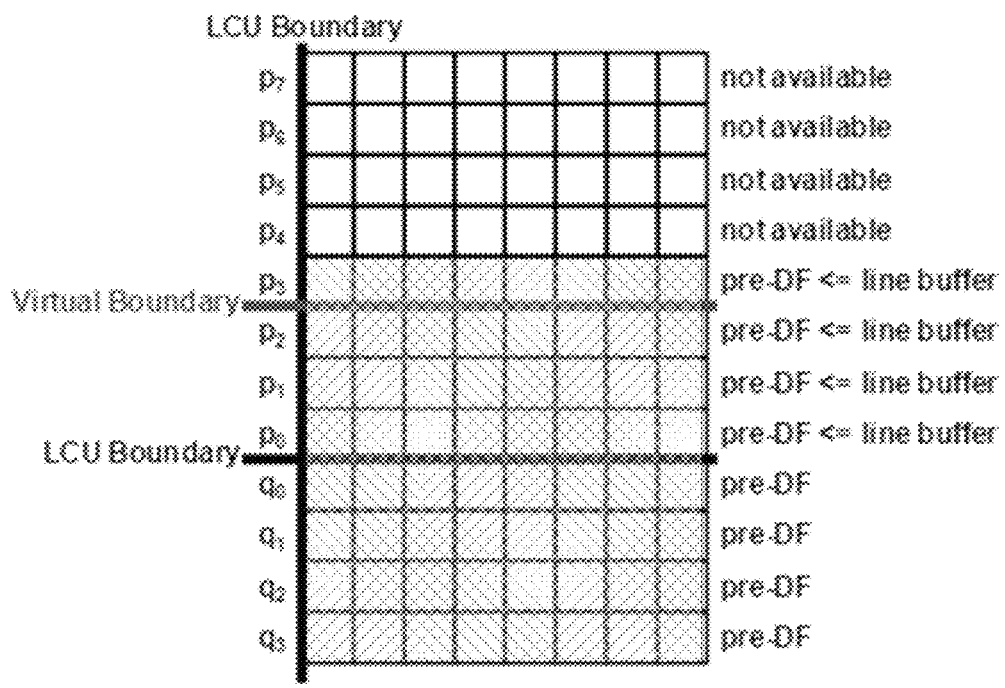
Figure 21:
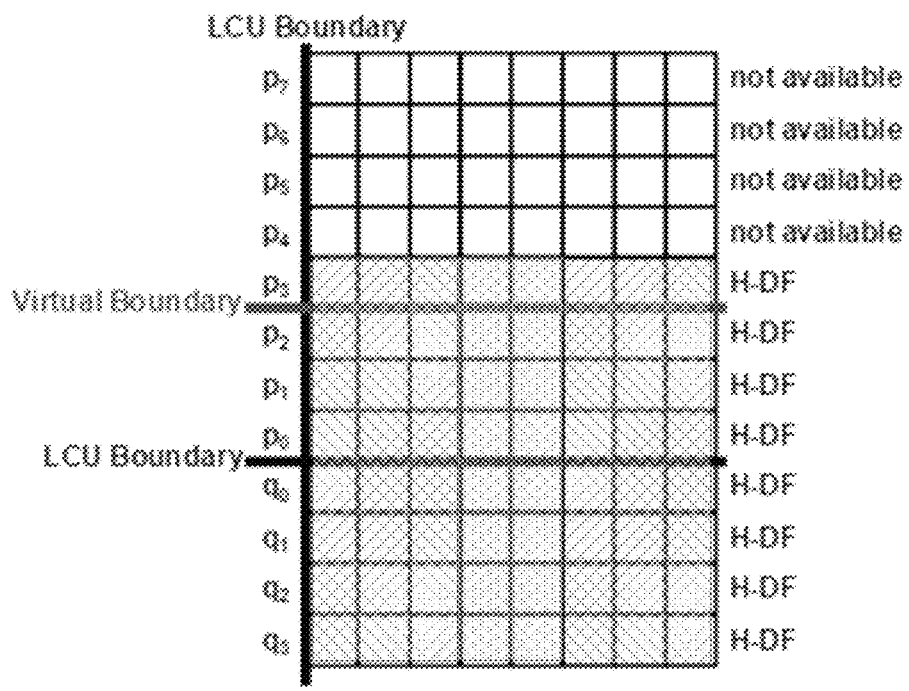
Figure 32:
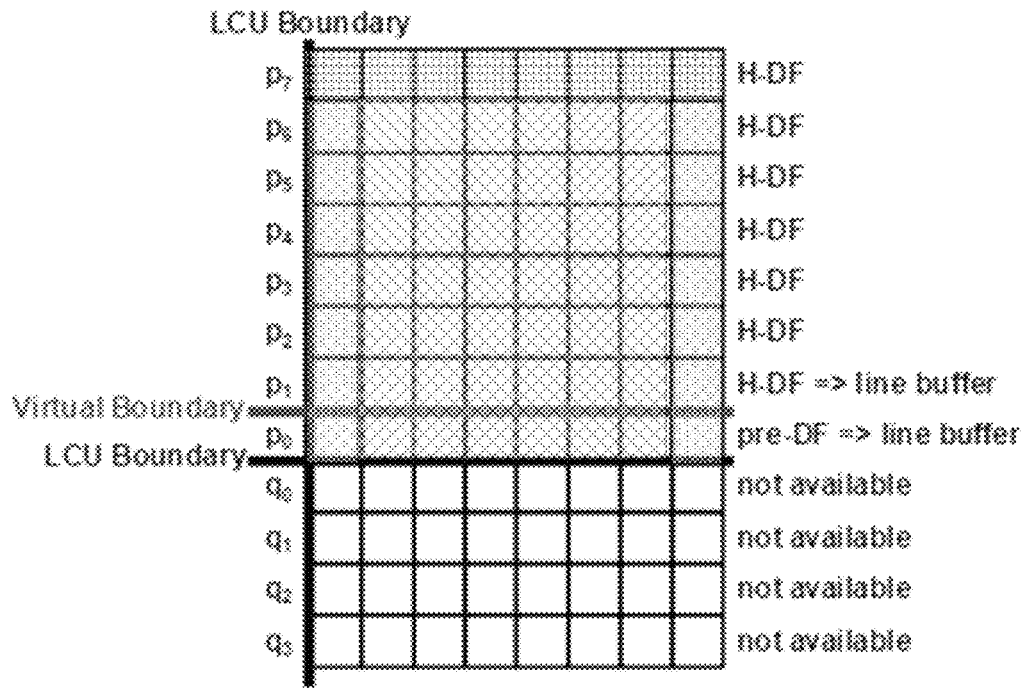
Figure 33:
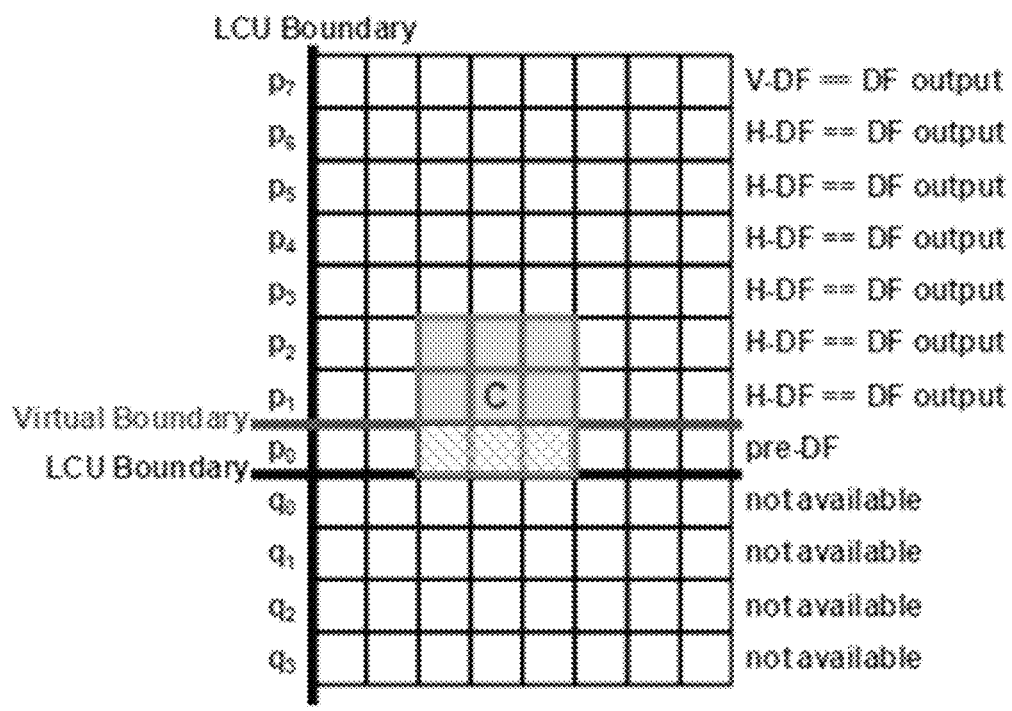
Figure 36:
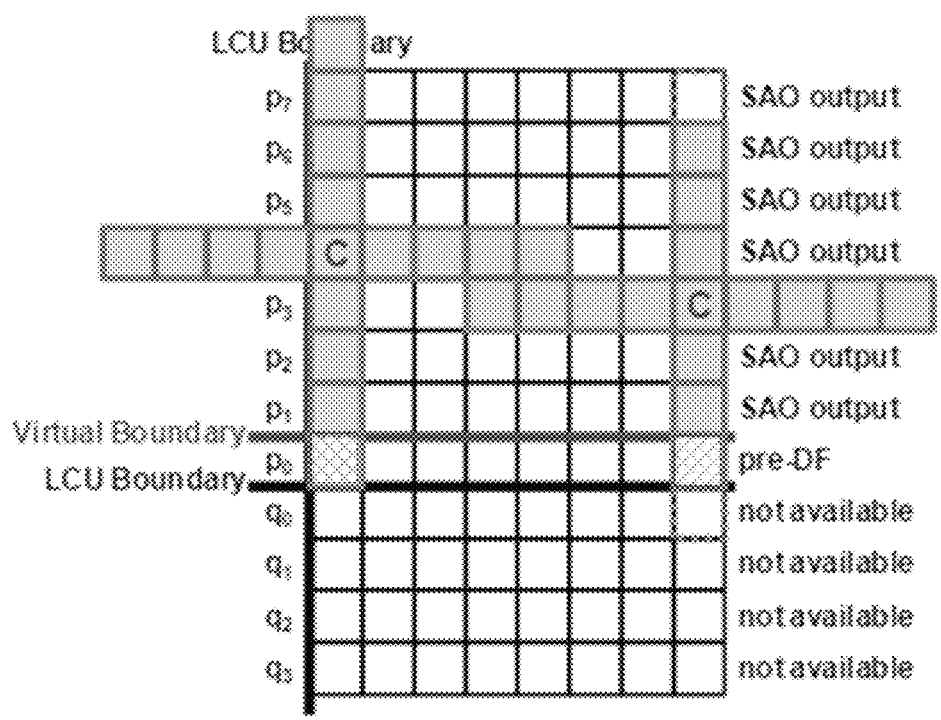
Figure 37:
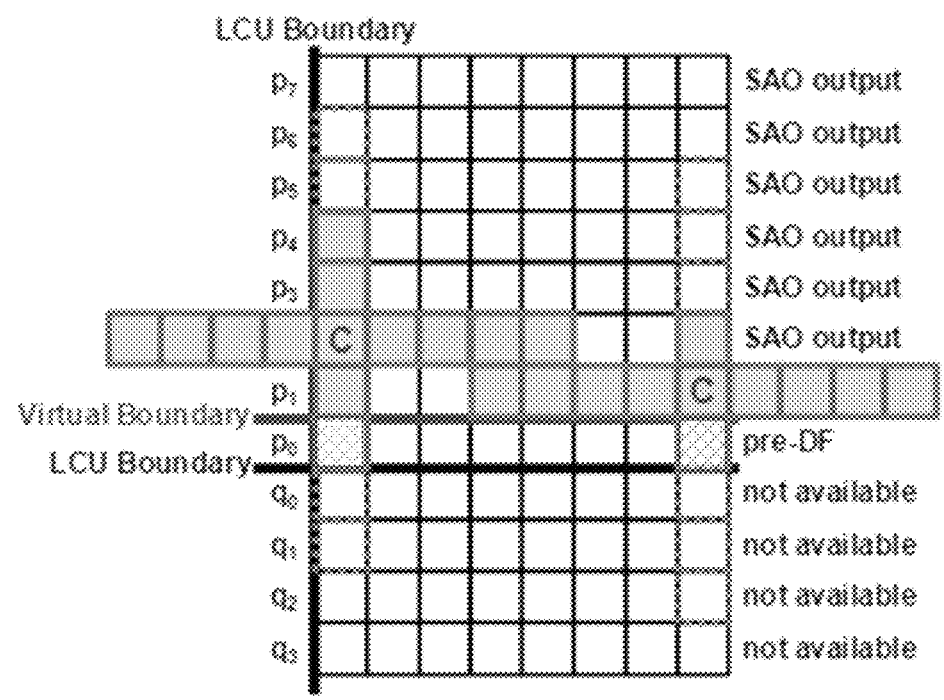
Figure 38:
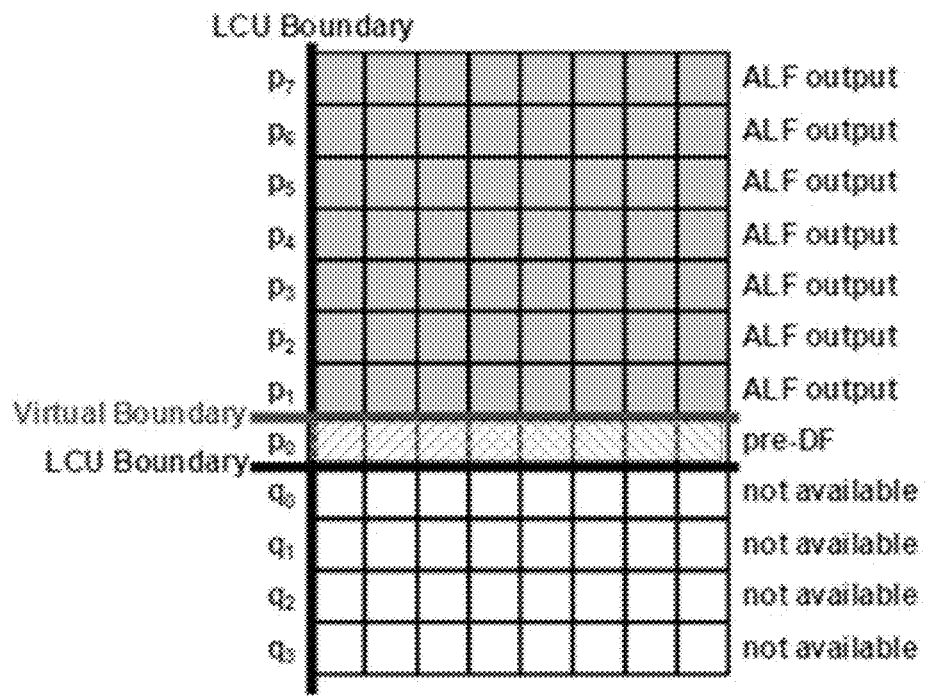
Figure 39:
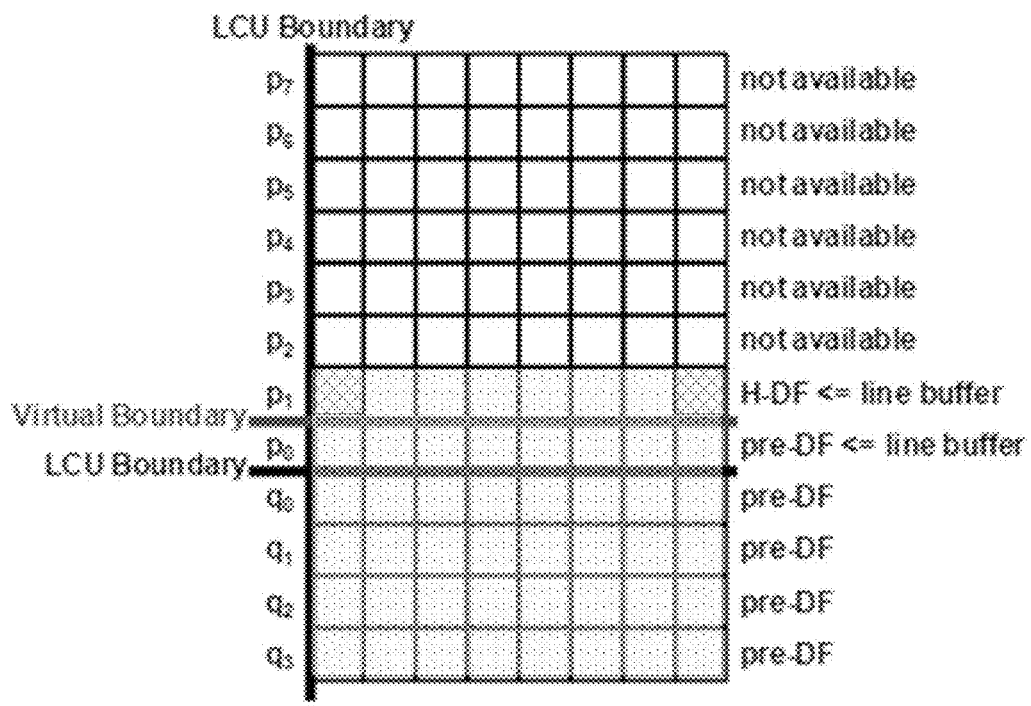
Figure 44:
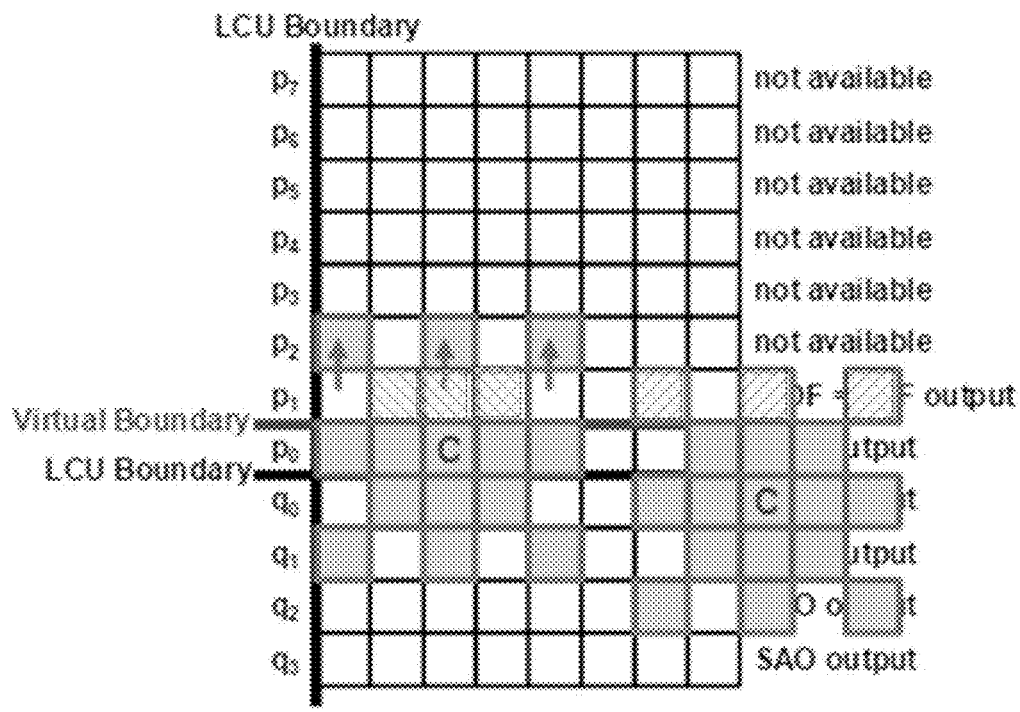
Figure 45:
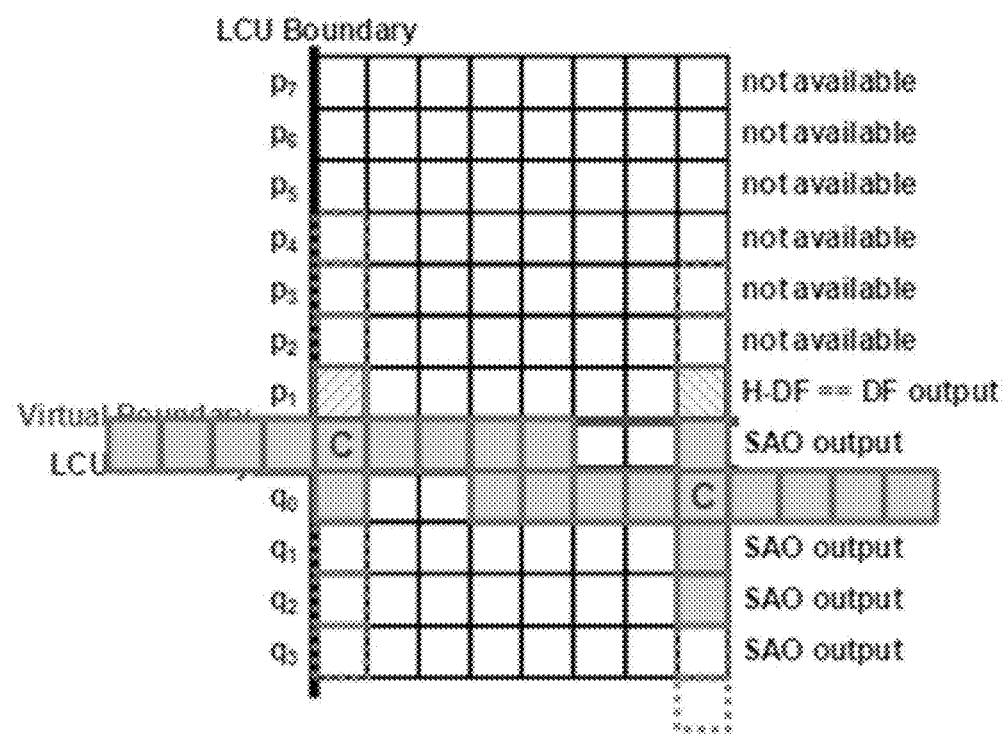
Figure 46:
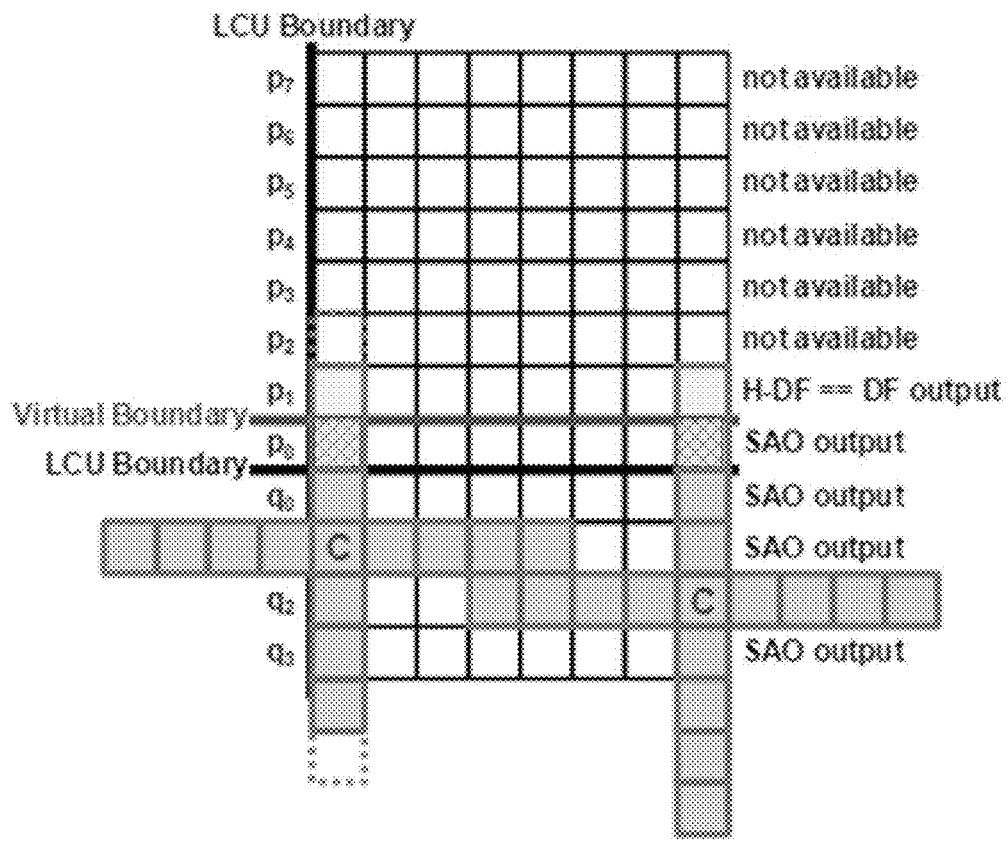
Figure 47:
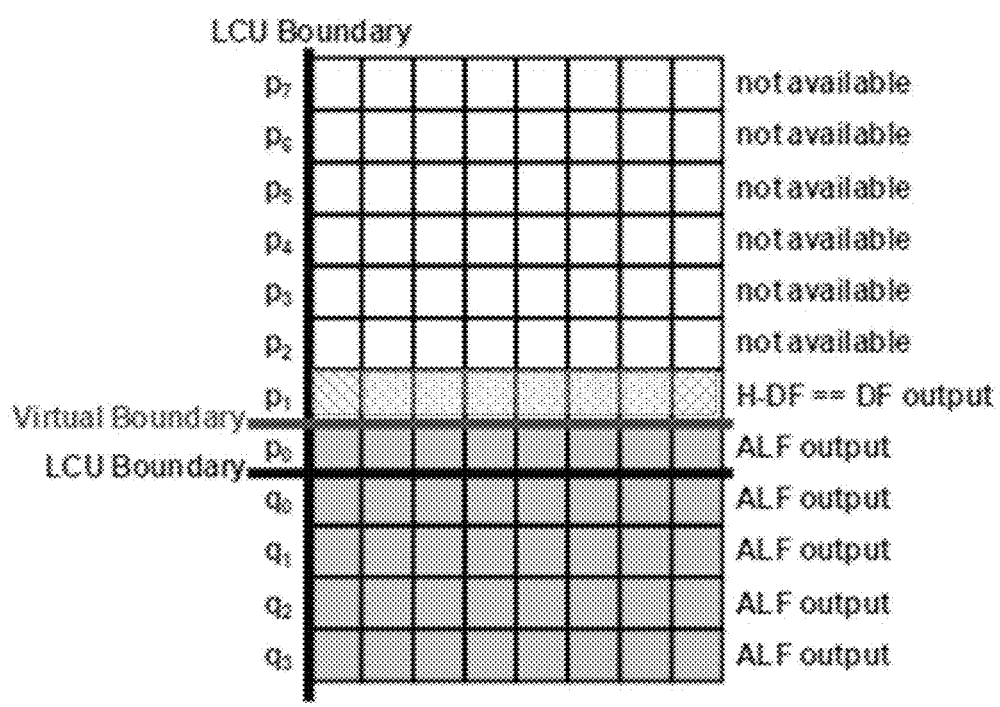

FIGS. 20-29 illustrate the proposed luma VB processing for pixels below the VB. In FIG. 20, four lines (i.e., $p_0$-$p_3$) of pre-DF pixels can be read from the DF line buffers. In FIG. 21, pixels of line $p_3$ and pixels below the VB are processed by horizontal DF. Please note that calculating horizontal DF decisions of lines $p_0$-$p_3$ requires pre-DF pixels of lines $p_0$-$p_7$. In order to save line buffers for lines $p_4$-$p_7$, these horizontal DF decisions are computed and stored in a decision line buffer during the horizontal DF for lines $p_3$-$p_7$ in FIG. 11. The decision buffer only requires one bit per 8×8 block and can be simply implemented as on-chip registers or SRAMs. In FIG. 22, pixels below the VB are processed by vertical DF. Please remember that vertical DF decisions use pre-DF pixels, so the vertical DF decisions at the horizontal LCU boundary have to be calculated before the horizontal DF is done in FIG. 21. In FIG. 23, pixels below the VB are going to be processed by SAO. Originally, SAO processing of line $p_2$ may need DF output pixels of line $p_3$. Since DF output pixels of line $p_3$ are already available, the SAO input pixels are not changed. In FIG. 24, all pixels below the VB (and above the next VB) have been processed by SAO. In FIGS. 25-28, pixels below the VB are going to be processed by ALF. Originally, calculating ALF block properties of lines $p_0$-$p_3$ requires SAO output pixels of lines $p_0$-$p_4$. However, SAO output pixels of lines $p_3$-$p_4$ are not available any more. Therefore, SAO output pixels of line $p_3$ are replaced by the available DF output pixels, as shown in FIG. 25. In addition, repetitive padding in the vertical direction is applied to generate pixels of line $p_4$ from DF output pixels of line $p_3$. During filtering, SAO output pixels above the VB may also be originally needed. In these cases, SAO output pixels are replaced by DF output pixels of line $p_3$, and padding or reducing the filter shape may be applied. In FIG. 26, where snowflake5×5 is selected for ALF, for filtering line $p_2$, SAO output pixels of the second row (i.e., line $p_3$) of the snowflake5×5 are replaced by DF output pixels, and SAO output pixels of the first row (i.e., line $p_4$) of the snowflake5×5 are replaced by nearest DF output pixels of line $p_3$. Moreover, the filtering output pixels of line $p_2$ are further averaged with SAO output pixels of line $p_2$ to generate final ALF output pixels of line $p_2$. For filtering line $p_1$, SAO output pixels of the first row (i.e., line $p_3$) of the snowflake5×5 are replaced by DF output pixels. In FIG. 27, where cross9×9 is selected for ALF, for filtering line $p_2$, the filter shape is reduced to cross9×3 with adding the six discarded coefficients to the center pixel, and SAO output pixels of the first row (i.e., line $p_3$) of the cross9×3 are replaced by DF output pixels. For filtering line $p_1$, the filter shape is reduced to cross9×5 with adding the four discarded coefficients to the center pixel, and SAO output pixels of the first row (i.e., line $p_3$) of the cross9×5 are replaced by the DF output pixels. In FIG. 28, where cross9×9 is also selected for ALF, for filtering line $p_0$, the filter shape is reduced to cross9×7 with adding the two discarded coefficients to the center pixel; and SAO output pixels of the first row (i.e., line $p_3$) of the cross9×7 are replaced by DF output pixels. For filtering line $g_0$, the filter shape is unchanged, and SAO output pixels of the first row (i.e., line $p_3$) of the cross9×9 are replaced by DF output pixels. In this way, it is unnecessary to change ALF syntax, and normalization of coefficients with multiplications and divisions can be avoided. In FIG. 29, all pixels below the VB (and above the next VB) have been processed by ALF. At this moment, pixels below the VB (and above the next VB) can be written to a decoded picture buffer.

The design principles of luma VB processing are summarized in Table 2. In FIG. 11 and FIG. 21, it can be seen that line $p_3$ is processed by horizontal DF twice. This only happens in LCU-based processing, not in picture-based processing like HM. The redundant computation causes very minor impact in hardware because the DF hardware has been already allocated and the DF is not the throughput bottleneck of the system. The redundant computation can be avoided by adding one line buffer to store H-DF pixels of line $p_3$; however, this is definitely not a good trade-off in hardware.

TABLE 2

Summary of the proposed luma VB processing

| Operation | To-Be-Processed Line | Design Principle |
| --- | --- | --- |
| SAO pixel classification | $1^{st}$ line above the VB | Use pre-DF pixels |
| ALF block property calculation | $1^{st}$ line above the VB | Copy upper block properties |
| ALF snowflake filtering | $1^{st}$ line above the VB | Use pre-DF pixels |
| ALF snowflake filtering | $2^{nd}$ line above the VB | Use pre-DF pixels |

TABLE 2-continued

Summary of the proposed luma VB processing

| Operation | To-Be-Processed Line | Design Principle |
| --- | --- | --- |
| ALF cross filtering | $1^{st}$ line above the VB | Use pre-DF pixels and reduce filter size |
| ALF cross filtering | $2^{nd}$ line above the VB | Use pre-DF pixels |
| ALF cross filtering | $3^{rd}$ line above the VB | Use pre-DF pixels |
| ALF cross filtering | $4^{th}$ line above the VB | Use pre-DF pixels |
| SAO pixel classification | $1^{st}$ line below the VB | Remain the same |
| ALF block property calculation | $1^{st}$, $2^{nd}$, and $3^{rd}$ lines below the VB | Use DF output pixels and padding |
| ALF snowflake filtering | $1^{st}$ line below the VB | Use DF output pixels, padding, and averaging |
| ALF snowflake filtering | $2^{nd}$ line below the VB | Use DF output pixels |
| ALF cross filtering | $1^{st}$ line below the VB | Use DF output pixels and reduce filter size |
| ALF cross filtering | $2^{nd}$ line below the VB | Use DF output pixels and reduce filter size |
| ALF cross filtering | $3^{rd}$ line below the VB | Use DF output pixels and reduce filter size |
| ALF cross filtering | $4^{th}$ line below the VB | Use DF output pixels |

The proposed chroma VB processing has the same concepts and similar principles as the proposed luma VB processing and is summarized in Table 3. FIGS. 30-38 show the chroma VB processing for pixels above the VB, and FIGS. 39-47 show the chroma VB processing for pixels below the VB. Please note that there is no redundant computation of chroma horizontal DF for line $p_1$ because the chroma vertical DF does not use any pre-DF pixel and the H-DF pixels of line $p_1$ are already stored in the line buffer.

TABLE 3

Summary of the proposed chroma VB processing

| Operation | To-Be-Processed Line | Design Principle |
| --- | --- | --- |
| SAO pixel classification | $1^{st}$ line above the VB | Use pre-DF pixels |
| ALF snowflake filtering | $1^{st}$ line above the VB | Use pre-DF pixels, padding, and averaging |
| ALF snowflake filtering | $2^{nd}$ line above the VB | Use pre-DF pixels |
| ALF cross filtering | $1^{st}$ line above the VB | Use pre-DF pixels and reduce filter size |
| ALF cross filtering | $2^{nd}$ line above the VB | Use pre-DF pixels and reduce filter size |
| ALF cross filtering | $3^{rd}$ line above the VB | Use pre-DF pixels and reduce filter size |
| ALF cross filtering | $4^{th}$ line above the VB | Use pre-DF pixels |
| SAO pixel classification | $1^{st}$ line below the VB | Remain the same |
| ALF snowflake filtering | $1^{st}$ line below the VB | Use DF output pixels, padding, and averaging |
| ALF snowflake filtering | $2^{nd}$ line below the VB | Use DF output pixels |
| ALF cross filtering | $1^{st}$ line below the VB | Use DF output pixels and reduce filter size |
| ALF cross filtering | $2^{nd}$ line below the VB | Use DF output pixels and reduce filter size |
| ALF cross filtering | $3^{rd}$ line below the VB | Use DF output pixels and reduce filter size |
| ALF cross filtering | $4^{th}$ line below the VB | Use DF output pixels |

The concept of virtual boundaries can still be applied in VVC to reduce the line buffer usage. In the above description, largest coding unit (LCU) is renamed as coding tree unit (CTU) in VVC. However, some modifications are proposed to fit the features of current ALF design.

Method 1

Figure 9A:
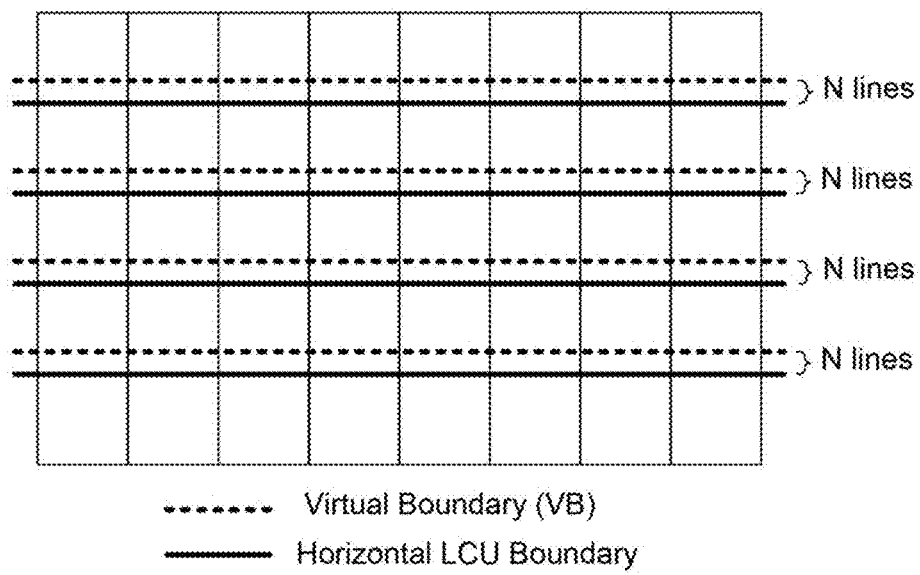
FIG. 9A illustrates an example of VBs by upward shifting horizontal LCU boundaries by N pixels.
Figure 9B:
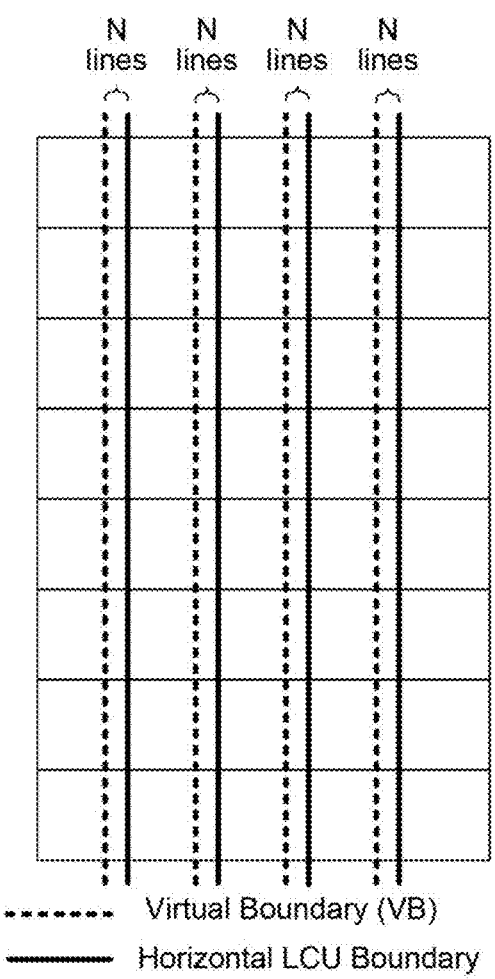
FIG. 9B illustrates an example of VBs by left shifting vertical LCU boundaries by N pixels.

The position of virtual boundaries should be aligned with the boundaries of smallest units (e.g., 4×4 blocks). Since all of pixels in one 4×4 luma block share the same filter coefficients (i.e., share the same ALF processing), the process of ALF with virtual boundaries becomes simple when virtual boundaries are aligned with the boundaries of 4×4 luma blocks. In other words, all of pixels in one 4×4 luma block should be located at the same side of virtual boundaries. Virtual boundaries cannot partition any 4×4 luma block into two regions. Since there is no classification for chroma component, no constraint related to the position of virtual boundaries for chroma component is required. In one embodiment, the space between the proposed virtual boundaries and the horizontal CTU boundaries is set to four pixels for luma (i.e. N=4 in FIG. 9A and FIG. 9B) and one pixel for chroma (i.e. N=1 in FIG. 9A and FIG. 9B).

Method 2

Figure 1A:
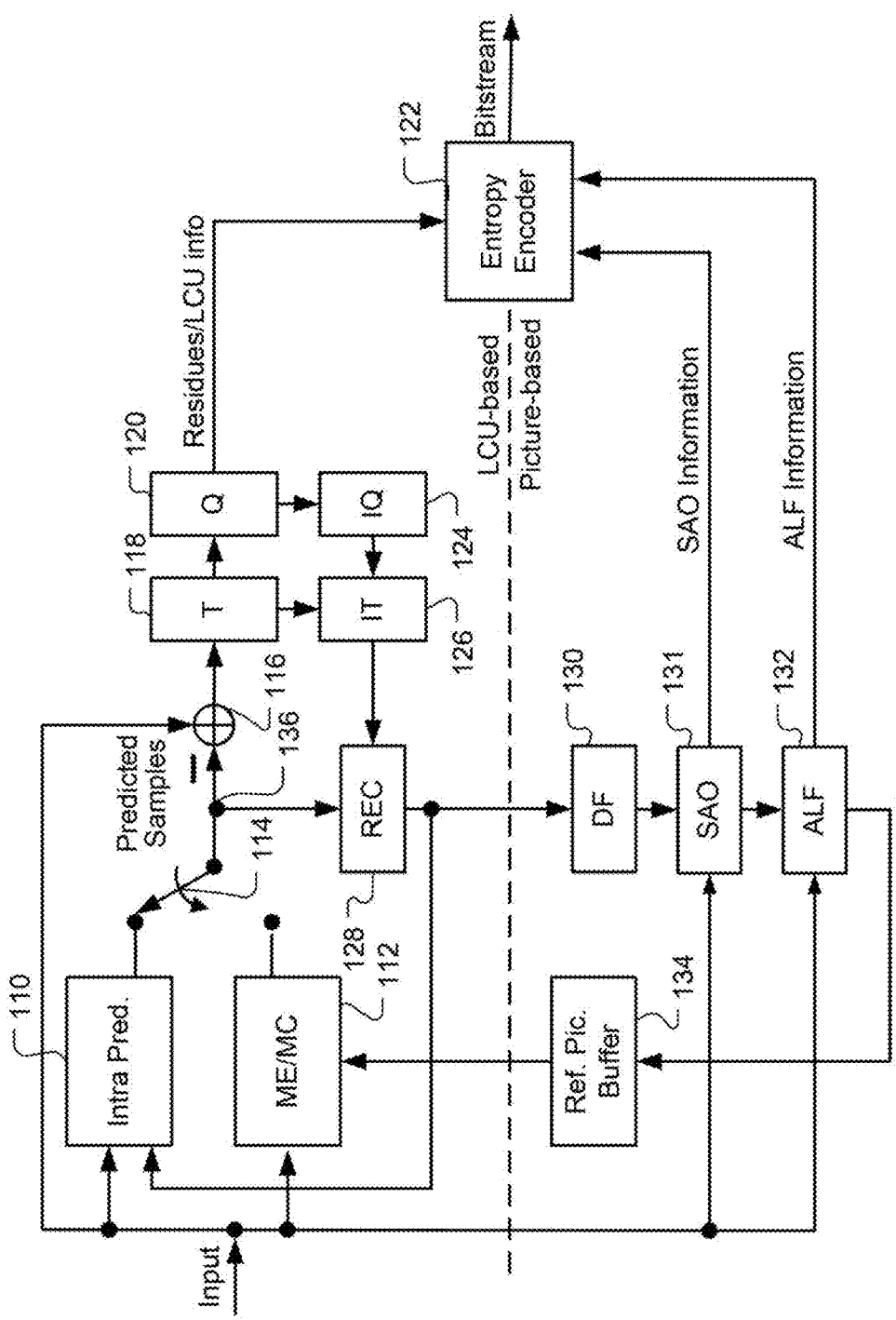
FIG. 1A illustrates an exemplary adaptive inter/intra video encoding system incorporating DF, SAO and ALF in-loop processing.
Figure 1B:
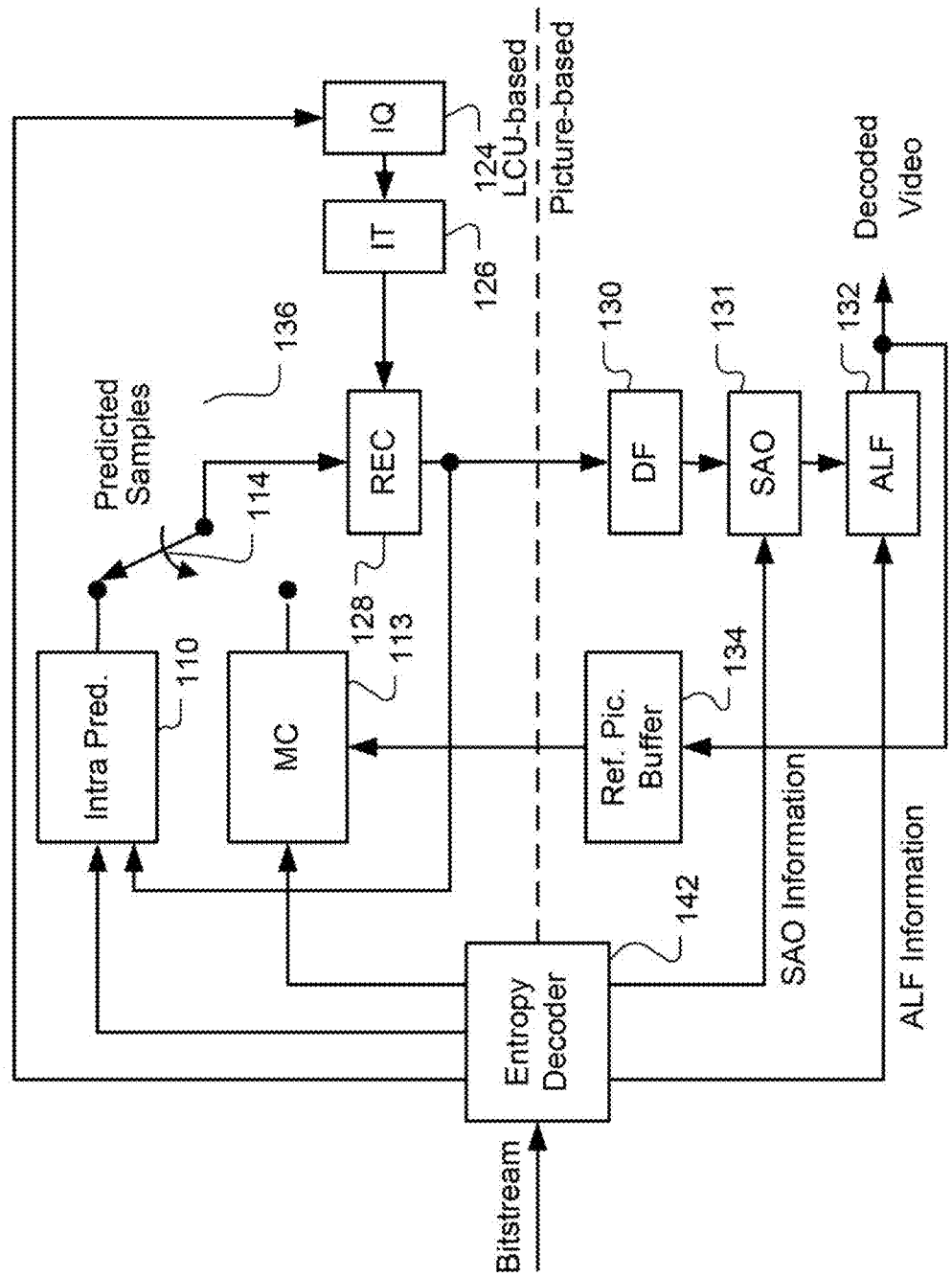
FIG. 1B illustrates an exemplary adaptive inter/intra video decoding system incorporating DF, SAO and ALF in-loop processing.
Figure 2:
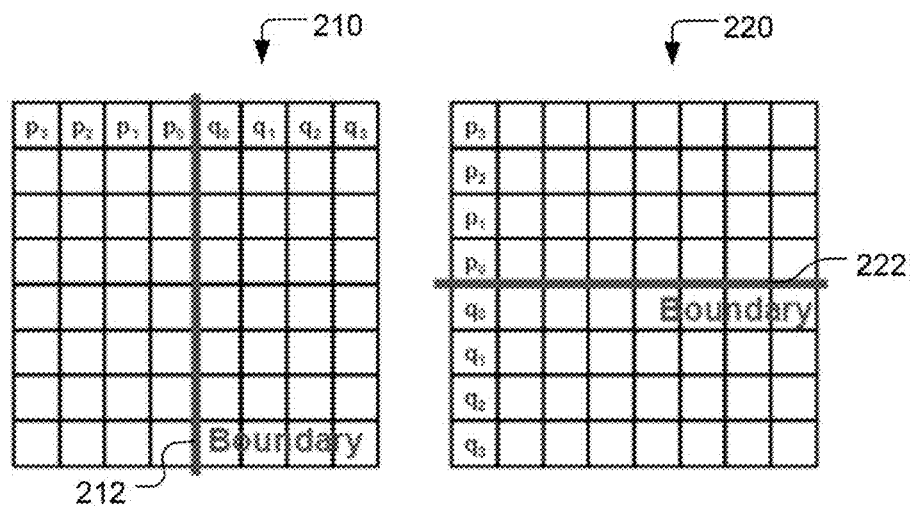
FIG. 2 illustrates an example of deblocking filter process applied on 8×8 block boundaries to reduce the visibility of artefacts at block boundaries, where a vertical boundary and a horizontal boundary are shown.
Figure 3:
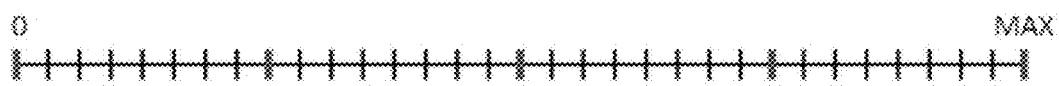
FIG. 3 illustrates an example of band offset (BO), where the pixel intensity range is equally divided into 32 bands and an offset value is determined for each band.
Figure 4:
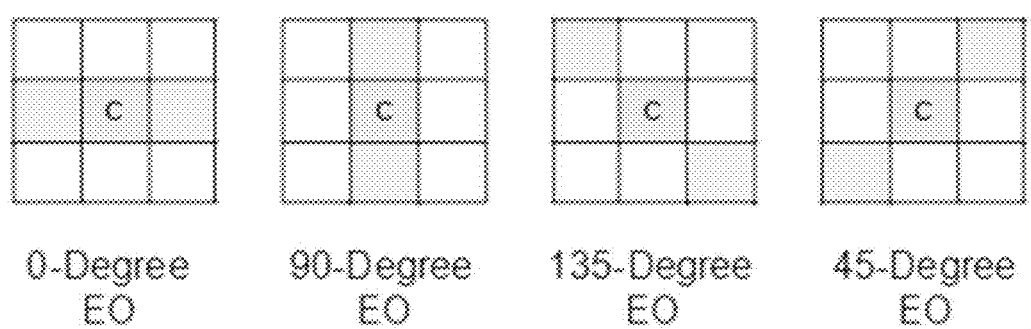
FIG. 4 illustrates Edge Offset (EO) windows corresponding to 0°, 90°, 135°, and 45° used in HEVC (high efficiency video coding) standard to determine the category for a current pixel to apply SAO (Sample Adaptive Offset).
Figure 5:
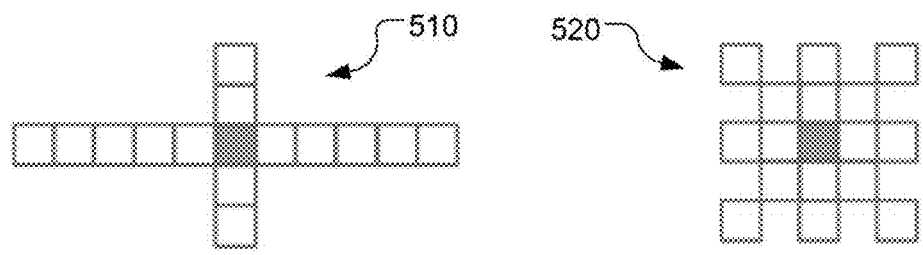
FIG. 5 illustrates an example of adaptive loop filter (ALF), where the ALF has two filter shape options corresponding to cross11×5 and snowflake5×5, for luma and chroma.
Figure 6A:
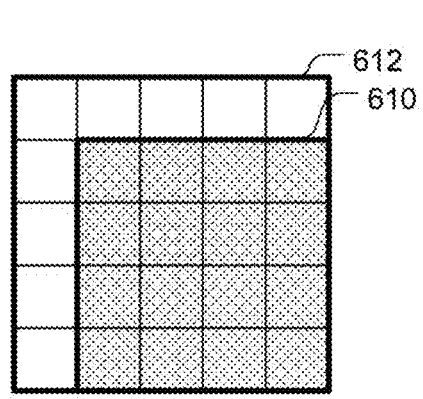
FIG. 6A illustrates an example of block adaptation (BA) for adaptive loop filter (ALF), where the BA mode uses edge activity and direction as a property for each 4×4 block.
Figure 6C:
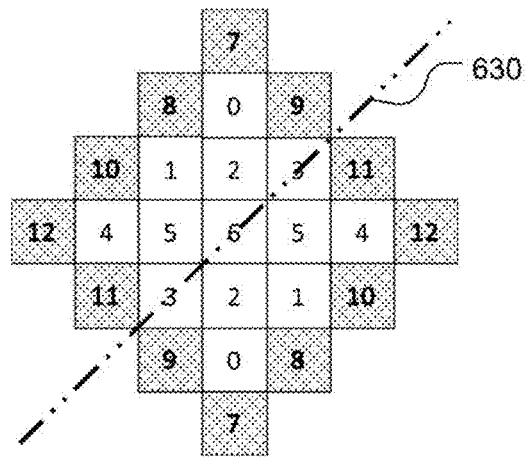
FIG. 6C illustrates an example of 7×7 diamond filter for luma and 5×5 diamond filter for chroma component, where the coefficients are half symmetry across diagonal line.
Figure 6B:
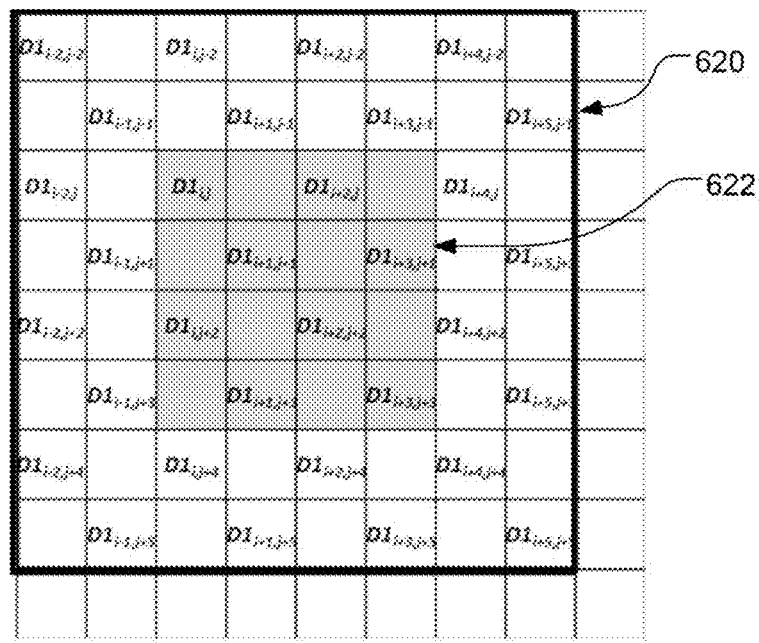
FIG. 6B illustrates an example of block classification for a target block by evaluating gradients at selected locations of an evaluation block, where the target 4×4 block shown in gray colour is located in the center of the evaluation block.
Figure 6D:
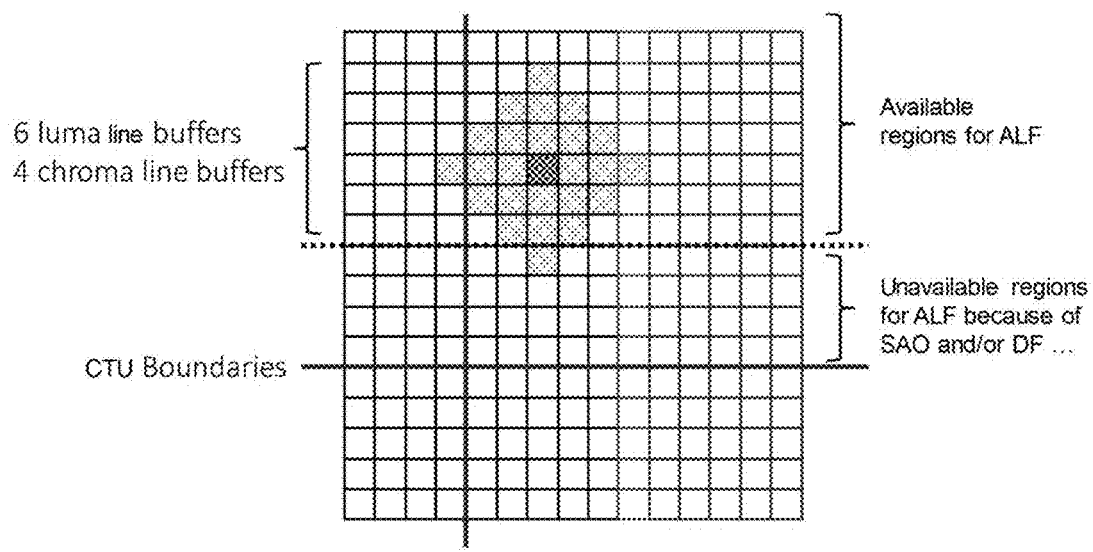
FIG. 6D illustrates an example of the line buffer requirement for ALF in VTM 4.0, where the filter footprint is 7×7 diamond filter for luma and 5×5 diamond filter for chroma.
Figure 6E:
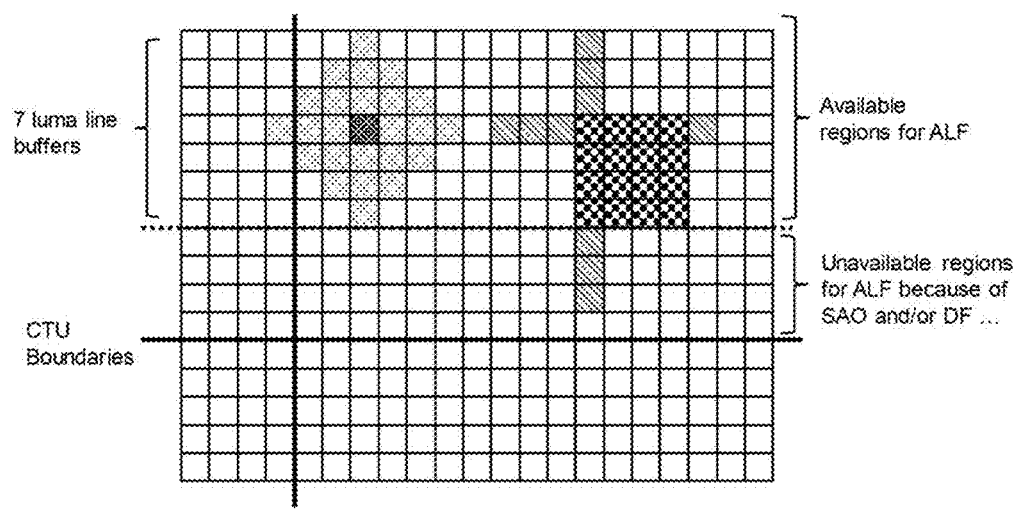
FIG. 6E illustrates an example of the line buffer requirement 4×4 block-based classification for ALF in VTM 4.0, where classification is performed for 4×4 block.
Figure 6F:
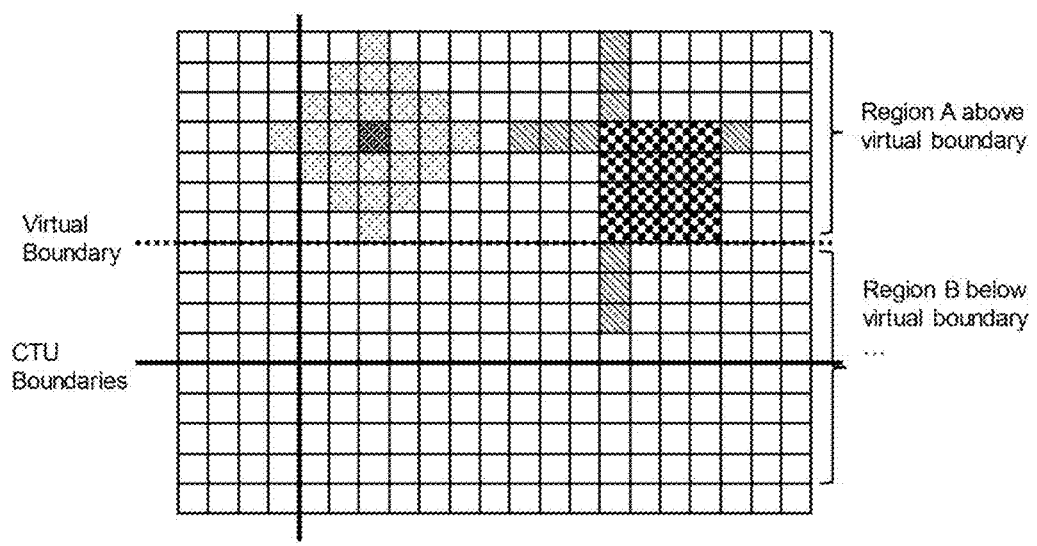
FIG. 6F illustrates an example of the concept is when ALF is applied to the pixels at one side of virtual boundary, then the pixels at the other side cannot be used.
Figure 7:
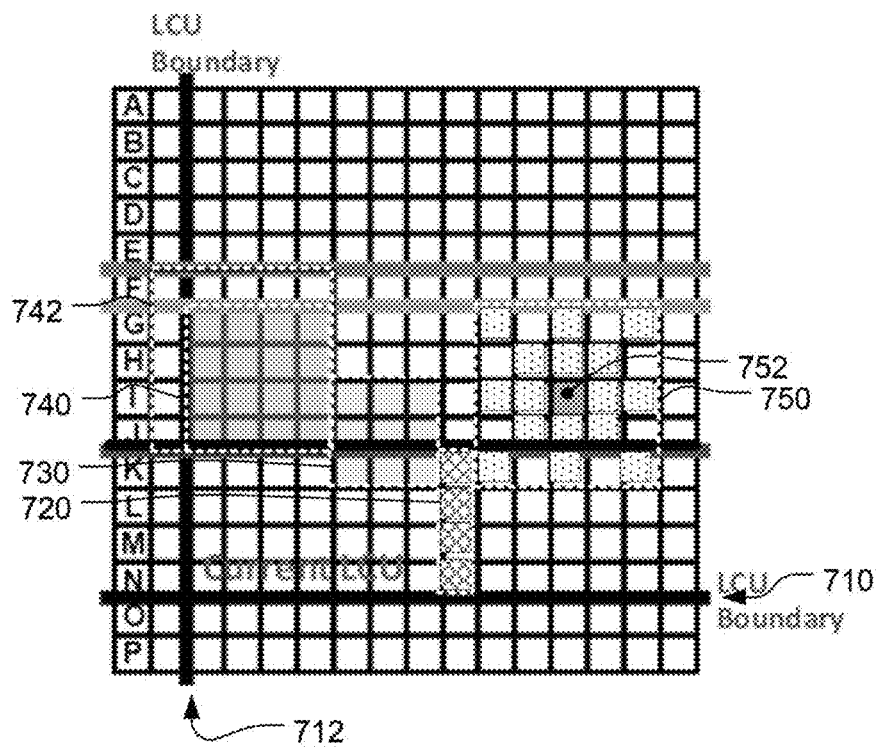
FIG. 7 illustrates an example of the number of luma line buffers required for DF, SAO, and ALF with LCU-based decoding.
Figure 8:
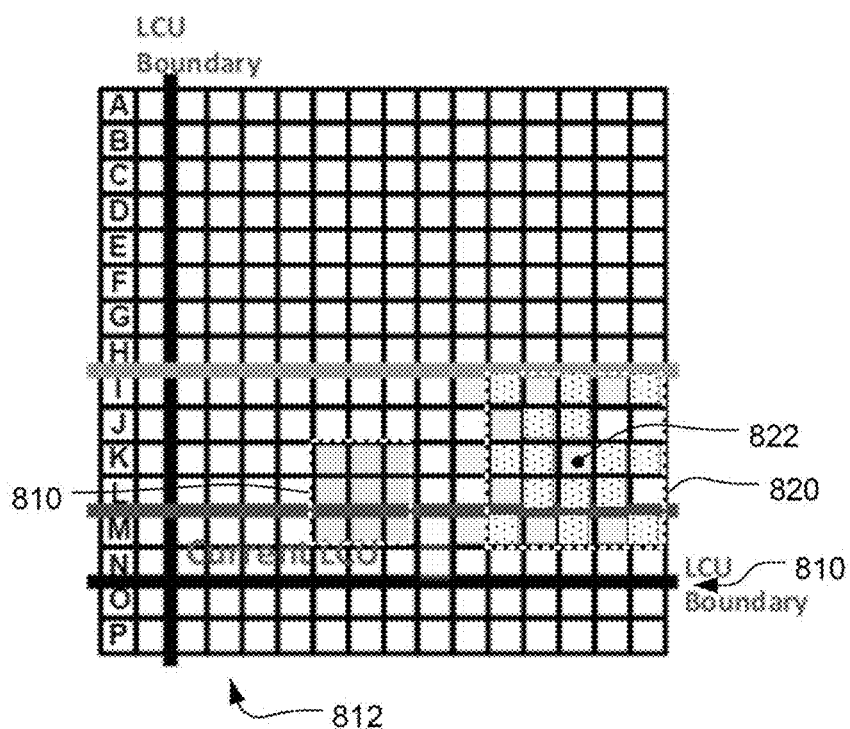
FIG. 8 illustrates an example of the number of chroma line buffers required for DF, SAO, and ALF with LCU-based decoding.

Since the block-based classification is used to achieve a high coding gain of ALF, those 4×4 blocks above the virtual boundaries or below the virtual boundaries can be treated as different groups compared to the other 4×4 blocks. As shown in FIG. 7, the virtual boundary is set as the boundary between line J and line K. The 4×4 blocks in lines G-J and lines K-N are treated as different groups compared to 4×4 blocks in other lines, such as lines C-F. We can apply different classification rules to the 4×4 blocks in lines G-J and lines K-N. In other words, the classification rules used to group 4×4 blocks into different categories include the position of 4×4 blocks or virtual boundaries. In one embodiment, there are original 25 categories for normal 4×4 blocks; an additional (i.e., 26-th) category corresponding to the case that those 4×4 blocks being above the virtual boundaries, and another additional (i.e., 27-th) category corresponding to the case that those 4×4 blocks being below the virtual boundaries. In another embodiment, there are original 25 categories for normal 4×4 blocks; those 4×4 blocks above or below the virtual boundaries are classified into one additional 26-th category. In another embodiment, there are original 25 categories for normal 4×4 blocks; those 4×4 blocks above or below the virtual boundaries are classified into another additional 25 categories by using the same classification rules. In one embodiment, ALF is not applied to these 4×4 blocks above or below the virtual boundaries. In another embodiment, the decision of disabling ALF for these 4×4 blocks above or below the virtual boundaries is signalled at a sequence level, picture level, tile level or slice level.

For one 4×4 block, one 10×10 window is required to calculate the block property. In one embodiment, the required pixel at the other side of virtual boundaries are not used in the process of block property calculation. In another embodiment, the padding technology is used to generate the required data, including activity, gradient, gradient directions, and so on, when the required pixel are at the other side of virtual boundaries.

Method 3

The position of virtual boundaries is the middle position in the vertical direction of one 4×4 luma block. In one embodiment, the space between the proposed virtual boundaries and the horizontal CTU boundaries is set as six pixels for luma (i.e. N=6 in FIG. 9A and FIG. 9B) and one pixel for chroma (i.e. N=1 in FIG. 9A and FIG. 9B). Those 4×4 luma blocks cross virtual boundaries (e.g. 4×4 blocks in lines G-J in FIG. 7) are not filtered by ALF.

Method 4

The concept of virtual boundaries is further extended to be one guard band. For those pixels in the guard band, ALF is disabled. For those to-be-filtered pixels or to-be-filtered 4×4 blocks above the guard band, the pixels below the guard band cannot be used but those pixels in the guard band can be referenced. For those to-be-filtered pixels or to-be-filtered 4×4 blocks below the guard band, the pixels above the guard band cannot be used but those pixels in the guard band can be referenced. In one embodiment, the guard band is set as four pixels for luma (i.e. N=6 in FIG. 9A and FIG. 9B) and the height is 4 pixels. That is, the guard band is defined as the region of lines G-J in FIG. 7. For those to-be-filtered pixels or to-be-filtered 4×4 blocks above the guard band (i.e., lines A-F in FIG. 7) only pixels above and including line J can be used. For those to-be-filtered pixels or to-be-filtered 4×4 blocks below the guard band (i.e., lines K-P in FIG. 7) only pixels below and including line G can be used. In another embodiment, for those to-be-filtered pixels or to-be-filtered 4×4 blocks below the guard band (i.e., lines K-P in FIG. 7) only pixels below and including some predefined line can be used and padding technology is used to generate the required pixels if the required pixel is above the predefined Line. For example, the predefined line can be line I or line J.

Method 5

When the concept of virtual boundaries or guard band is applied and padding technology is used to generate the required pixels instead of accessing the real pixels, the output value of ALF can be the weighted sum of filtered result and the unfiltered pixel. The weights for filtered results are decreased when less real pixels are used in the filtering process (i.e. more padded pixels are used in the filtering process). In one embodiment, the virtual boundaries disclosed in Method 1 is used. Therefore, the space between the proposed virtual boundaries and the horizontal CTU boundaries is set to four pixels for luma (i.e. N=4 in FIG. 9A and FIG. 9B) and one pixel for chroma (i.e. N=1 in FIG. 9A and FIG. 9B). The output value of ALF in line G and line N is equal to the filtered result. The output value of ALF in line H and line M is equal to ((the filtered result+the unfiltered result)/2). The output value of ALF in line I and line L is equal to ((the filtered result+3×the unfiltered result)/4). The output value of ALF in line J and line K is equal to ((the filtered result+7×the unfiltered result)/8). In another embodiment, the output value of ALF in line G and line N is equal to ((the filtered result+the unfiltered result)/2). The output value of ALF in Line H and Line M is equal to (the filtered result+3×the unfiltered result)/4. The output value of ALF in Line I and Line L is equal to (the filtered result+7×the unfiltered result)/8. The output value of ALF in line J and line K is equal to (the filtered result+15×the unfiltered result)/16. In another embodiment, the output value of ALF in line G and line N is equal to (4×the filtered result+0×the unfiltered result)/4. The output value of ALF in line H and line M is equal to (3×the filtered result+1×the unfiltered result)/4. The output value of ALF in line I and line L is equal to ((2×the filtered result+2×the unfiltered result)/4). The output value of ALF in line J and line K is equal to ((1×the filtered result+3× the unfiltered result)/4). In another embodiment, the rounding offset is considered when generating the weighted sum of the filtered result and the unfiltered result. In another embodiment, the output value of ALF in line G and line N is equal to ((7×the filtered result+1×the unfiltered result)/8). The output value of ALF in line H and line M is equal to ((5×the filtered result+3×the unfiltered result)/8). The output value of ALF in line I and line L is equal to ((3×the filtered result+5×the unfiltered result)/8). The output value of ALF in line J and line K is equal to ((1×the filtered result+7× the unfiltered result)/8). In another embodiment, the rounding offset is considered when generating the weighted sum of the filtered result and the unfiltered result. In another embodiment, the rounding offset is considered when generating the weighted sum of the filtered result and the unfiltered result.

Method 6

The padding technology in the above methods can be direct padding, padding with even mirroring, padding with odd mirroring, some predefined value, to-be-filtered pixel, to-be-filtered pixel row, some intermediate result before ALF process, or some combination of the above. In another embodiment, the padding technology is to use the symmetric line in the filter shape when the required pixels are unavailable. For example, the virtual boundaries proposed in Method 1 is used. The space between the proposed virtual boundaries and the horizontal CTU boundaries is set to four pixels for luma (i.e. N=4 in FIG. 9A and FIG. 9B) and one pixel for chroma (i.e. N=1 in FIG. 9A and FIG. 9B). When the to-be-filtered pixels are located in line K, then the real pixels in line H-J cannot be accessed because of virtual boundaries. We use line L to replace line J, line M to replace line I, and line N to replace line K. When the to-be-filtered pixels are located in line L, then the real pixels in line I and line J cannot be accessed; line N is used to replace line J and line O is used to replace line I.

The above methods can be used individually or combined together to achieve one total solution in order to reduce line buffer usage of ALF.

Method 7

In one embodiment, the required pixels at the other side of virtual boundaries are replaced by the padded samples in ALF process, including classification and filtering operations. In other words, padding technology is used to generate the required samples for all processes in ALF, instead of accessing the real pixels at the other side of virtual boundaries. For example, when calculating gradients, if some of the required pixels in one 10×10 window used in classification are on the other side of virtual boundaries, then padding technology is used to generate the corresponding pixels.

In one embodiment, the operations of block classification are changed when part of the required pixels in one 10×10 window used in classification are on the other side of virtual boundaries. For example, if part of the required pixels in one 10×10 window used in classification are on the other side of virtual boundaries, then those gradients with position on the other side of virtual boundaries are set as zeros (i.e. not used), then the summation of gradients are normalized by the total number of available gradients. In another example, if part of the required pixels in one 10×10 window used in classification are at the other side of virtual boundaries, then the pattern of required gradients is changed to avoid using those pixels on the other side of virtual boundaries.

Any of the foregoing proposed methods can be implemented in encoders and/or decoders. For example, any of the proposed methods can be implemented in an in-loop filtering module of an encoder and/or a decoder. Alternatively, any of the proposed methods can be implemented as a circuit coupled to in-loop filtering module of the encoder and/or the decoder.

Figure 48:
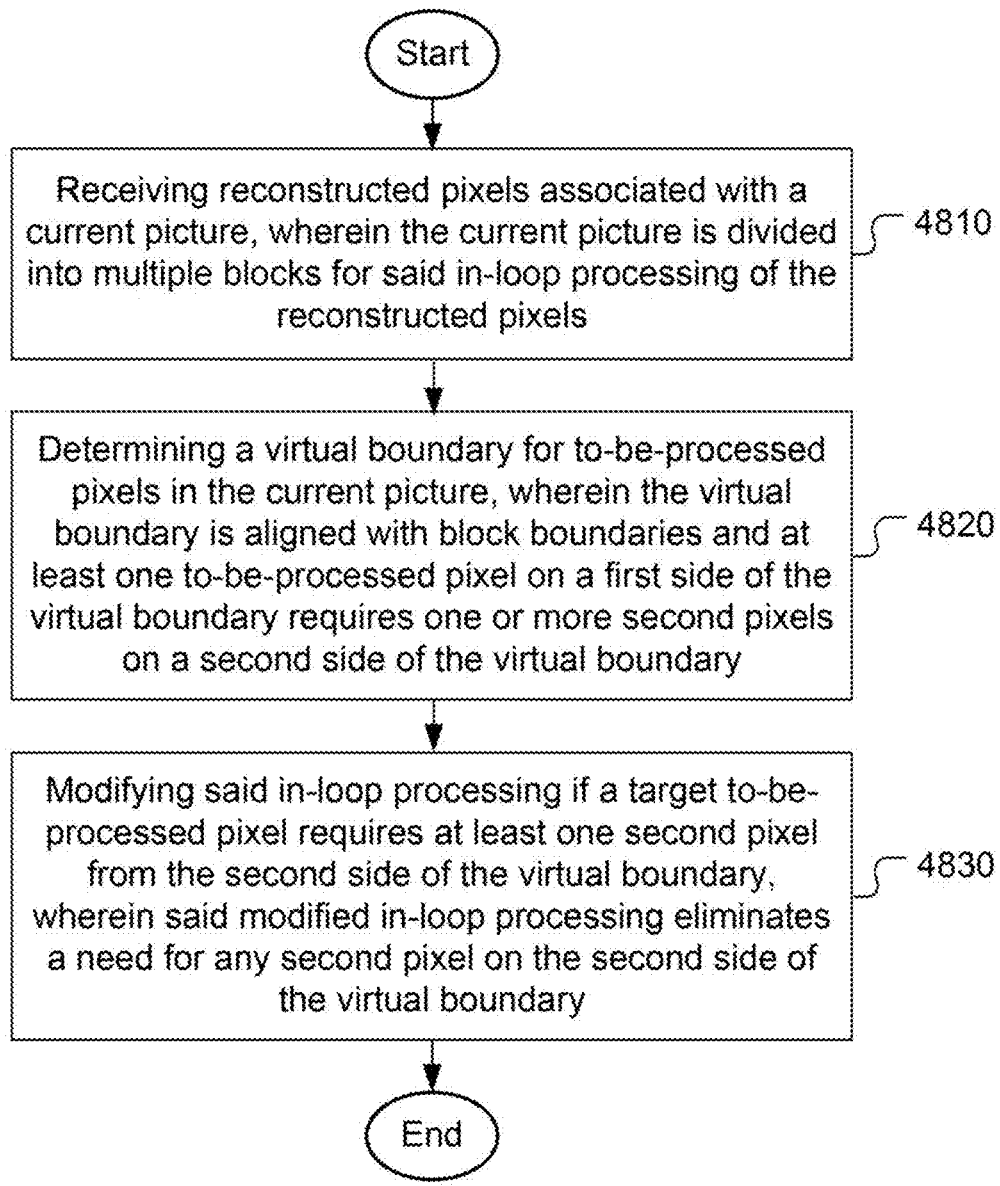
FIG. 48 illustrates a flowchart of an exemplary in-loop processing of reconstructed video according to an embodiment of the present invention.

FIG. 48 illustrates a flowchart of an exemplary in-loop processing of reconstructed video according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, reconstructed pixels associated with a current picture are received in step 4810, wherein the current picture is divided into multiple blocks for said in-loop processing of the reconstructed pixels. A virtual boundary for to-be-processed pixels in the current picture is determined in step 4820, wherein the virtual boundary is aligned with block boundaries and at least one to-be-processed pixel on a first side of the virtual boundary requires one or more second pixels on a second side of the virtual boundary. Said in-loop processing is modified in step 4830 if a target to-be-processed pixel requires at least one second pixel from the second side of the virtual boundary, wherein said modified in-loop processing eliminates a need for any second pixel on the second side of the virtual boundary.

Figure 49:
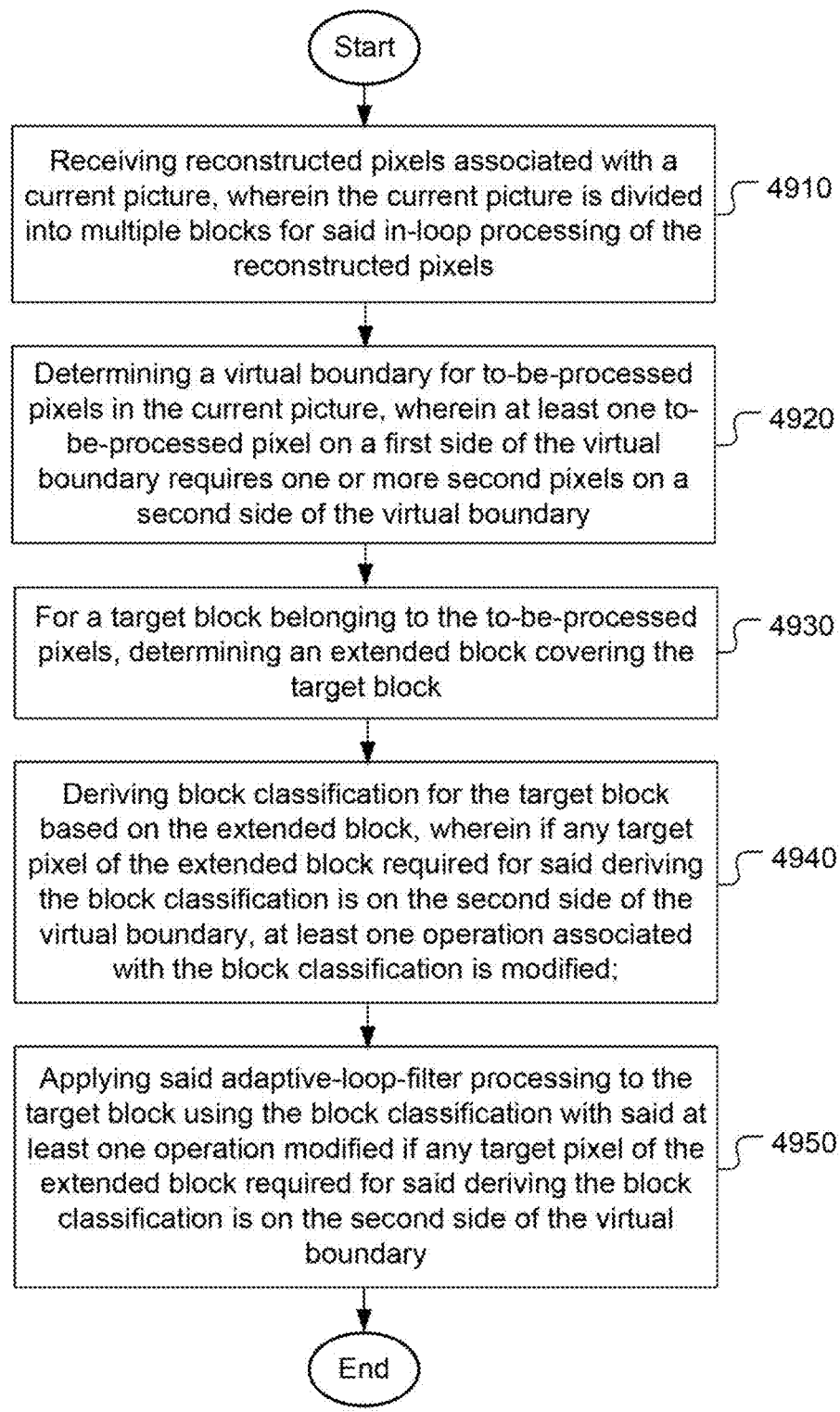
FIG. 49 illustrates a flowchart of exemplary adaptive-loop-filter processing of reconstructed video according to an embodiment of the present invention.

FIG. 49 illustrates a flowchart of exemplary adaptive-loop-filter processing of reconstructed video according to an embodiment of the present invention. According to another method, reconstructed pixels associated with a current picture are received in step 4910, wherein the current picture is divided into multiple blocks for said adaptive-loop-filter processing of the reconstructed pixels. A virtual boundary for to-be-processed pixels in the current picture is determined in step 4920, wherein at least one to-be-processed pixel on a first side of the virtual boundary requires one or more second pixels on a second side of the virtual boundary. An extended block covering the target block is determined in step 4930 for a target block belonging to the to-be-processed pixels. Block classification is derived for the target block based on the extended block in step 4940, wherein if any target pixel of the extended block required for said deriving the block classification is on the second side of the virtual boundary, at least one operation associated with the block classification is modified. Said adaptive-loop-filter processing is applied to the target block using the block classification with said at least one operation modified in step 4950 if any target pixel of the extended block required for said deriving the block classification is on the second side of the virtual boundary.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for adaptive-loop-filter processing of reconstructed video, the method comprising:
   receiving reconstructed pixels associated with a current picture, wherein the current picture is divided into multiple blocks for said adaptive-loop-filter processing of the reconstructed pixels;
   determining a virtual boundary for to-be-processed pixels in the current picture, wherein at least one to-be-processed pixel on a first side of the virtual boundary requires one or more second pixels on a second side of the virtual boundary;
   for a target block belonging to the to-be-processed pixels, determining an extended block covering the target block;

deriving block classification for the target block based on the extended block, wherein if any target pixel of the extended block required for said deriving the block classification is on the second side of the virtual boundary, at least one operation associated with the block classification is modified; and applying said adaptive-loop-filter processing to the target block using the block classification with said at least one operation modified if any target pixel of the extended block required for said deriving the block classification is on the second side of the virtual boundary.

2. The method of claim 1, wherein an evaluation block is determined for the target block, wherein the target block is located at a center of the evaluation block and surrounding pixels are added to the evaluation block to form the extended block.

3. The method of claim 2, wherein the target block corresponds to a 4×4 block, the evaluation block corresponds to an 8×8 block and the extended block corresponds to a 10×10 block.

4. The method of claim 3, wherein the target block corresponds to a smallest unit, and wherein all samples in each smallest block share an identical adaptive-loop-filter processing.

5. The method of claim 2, wherein the block classification is derived based on gradients at selected locations of the evaluation block.

6. The method of claim 5, wherein if a target gradient for a target selected location of the evaluation block requires any target pixel of the extended block on the second side of the virtual boundary, the target gradient is excluded from a summation of gradients for the block classification or is set to zero.

7. The method of claim 6, wherein the summation of gradients are weighted according to a total number of available gradients at the selected locations of the evaluation block.

8. The method of claim 6, wherein the summation of gradients are normalized by a total number of available gradients at the selected locations of the evaluation block.

9. The method of claim 5, wherein if a target gradient for a target selected location of the evaluation block requires any target pixel of the extended block on the second side of the virtual boundary, the target gradient for the target selected location of the evaluation block is modified to exclude said any target pixel of the extended block on the second side of the virtual boundary.

10. The method of claim 5, wherein the selected locations of the evaluation block correspond to 2:1 horizontal sub-sampled locations with one-pixel offset between even lines and odd lines.

11. An apparatus for adaptive-loop-filter processing of reconstructed video, the apparatus comprising one or more electronic circuits or processors arranged to:

receive reconstructed pixels associated with a current picture, wherein the current picture is divided into multiple blocks for said adaptive-loop-filter processing of the reconstructed pixels;

determine a virtual boundary for to-be-processed pixels in the current picture, wherein at least one to-be-processed pixel on a first side of the virtual boundary requires one or more second pixels on a second side of the virtual boundary;

for a target block belonging to the to-be-processed pixels, determine an extended block covering the target block;

derive block classification for the target block based on the extended block, wherein if any target pixel of the extended block required to derive the block classification is on the second side of the virtual boundary, at least one operation associated with the block classification is modified; and apply said adaptive-loop-filter processing to the target block using the block classification with said at least one operation modified if any target pixel of the extended block required to derive the block classification is on the second side of the virtual boundary.

* * * * *